(12) United States Patent
Fu et al.

(10) Patent No.: US 12,402,173 B2
(45) Date of Patent: Aug. 26, 2025

(54) METHOD FOR RANDOM ACCESS RESOURCE CONFIGURATION, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zhe Fu, Guangdong (CN); Xue Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 449 days.

(21) Appl. No.: 18/057,706

(22) Filed: Nov. 21, 2022

(65) Prior Publication Data
US 2023/0092926 A1 Mar. 23, 2023

Related U.S. Application Data

(63) Continuation of application No. PCT/CN2020/100264, filed on Jul. 3, 2020.

(51) Int. Cl.
*H04W 74/0833* (2024.01)
*H04W 74/0836* (2024.01)

(52) U.S. Cl.
CPC .... *H04W 74/0833* (2013.01); *H04W 74/0836* (2024.01)

(58) Field of Classification Search
CPC .............................. H04L 12/28; H04L 12/50
USPC ........................................ 370/329, 401, 395
See application file for complete search history.

(56) References Cited

U.S. PATENT DOCUMENTS

| 2016/0157218 A1* | 6/2016 | Nam ................. H04B 7/0632 370/329 |
| 2019/0124589 A1 | 4/2019 | Bogineni et al. |
| 2024/0381434 A1* | 11/2024 | Kim .................. H04W 72/02 |

FOREIGN PATENT DOCUMENTS

| CN | 107872884 | 4/2018 |
| CN | 108633050 | 10/2018 |
| CN | 109644494 | 4/2019 |
| CN | 110583088 | 12/2019 |
| WO | 2018147795 | 8/2018 |

OTHER PUBLICATIONS

EPO, Communication for EP Application No. 20942572.7, Feb. 19, 2024.
EPO, Communication for EP Application No. 20942572.7, Jul. 11, 2024.
CNIPA, First Office Action for CN Application No. 202310198676.5, Jun. 5, 2024.
EPO, Communication for EP Application No. 20942572.7, Jan. 2, 2025.
CNIPA, Third Office Action for CN Application No. 202310198676.5, Jan. 23, 2025.

(Continued)

*Primary Examiner* — Dang T Ton
(74) *Attorney, Agent, or Firm* — Hodgson Russ LLP

(57) ABSTRACT

A method for random access resource configuration, a terminal device, and a network device are provided. The method includes the following. A terminal device receives first configuration information, where the first configuration information includes at least two random access resources associated with or corresponding to a network slice.

18 Claims, 4 Drawing Sheets

(56) References Cited

OTHER PUBLICATIONS

CNIPA, Second Office Action for CN Application No. 202310198676.5, Sep. 28, 2024.
"3rd Generation Partnership Project; Technical Specification Group Radio Access Network; NR; NR and NG-RAN Overall Description; Stage 2 (Release 17)," 3GPP TS 38.300, Mar. 2022, v17.0.0.
"3rd Generation Partnership Project; Technical Specification Group Radio Access Network; NR; Medium Access Control (MAC) protocol specification (Release 17)," 3GPP TS 38.321, Jun. 2022, v17.1.0.
"3rd Generation Partnership Project; Technical Specification Group Radio Access Network; NR; Radio Resource Control (RRC) protocol specification (Release 17)," 3GPP TS 38.331, Jun. 2022, v17.1.0.
ETSI MCC, "Report of 3GPP TSG RAN2#98 meeting, Hangzhou, China," 3GPP TSG-RAN WG2 meeting #99, R2-1707601, Aug. 2017.
Huawei, "Key principles for Support of Network Slicing in RAN," RAN WG2 Meeting #95, R2-165019, Aug. 2016.
WIPO, International Search Report and Written Opinion for International Application No. PCT/CN2020/100264, Mar. 25, 2021.
Interdigital Inc., "PRACH Resources for NR," 3GPP TSG-RAN WG2 Meeting #98, R2-1704909, May 2017.
Interdigital Communications, "PRACH Resources for NR," 3GPP TSG-RAN WG2 Meeting #97bis, R2-1702870, Apr. 2017.
EPO, Extended European Search Report for EP Application No. 20942572.7, May 2, 2023.
EPO, Office Action issued for European Application No. 20942572.7, Nov. 14, 2023.
CNIPA, Rejection Decision for CN Application No. 202310198676.5, Mar. 29, 2025.

* cited by examiner

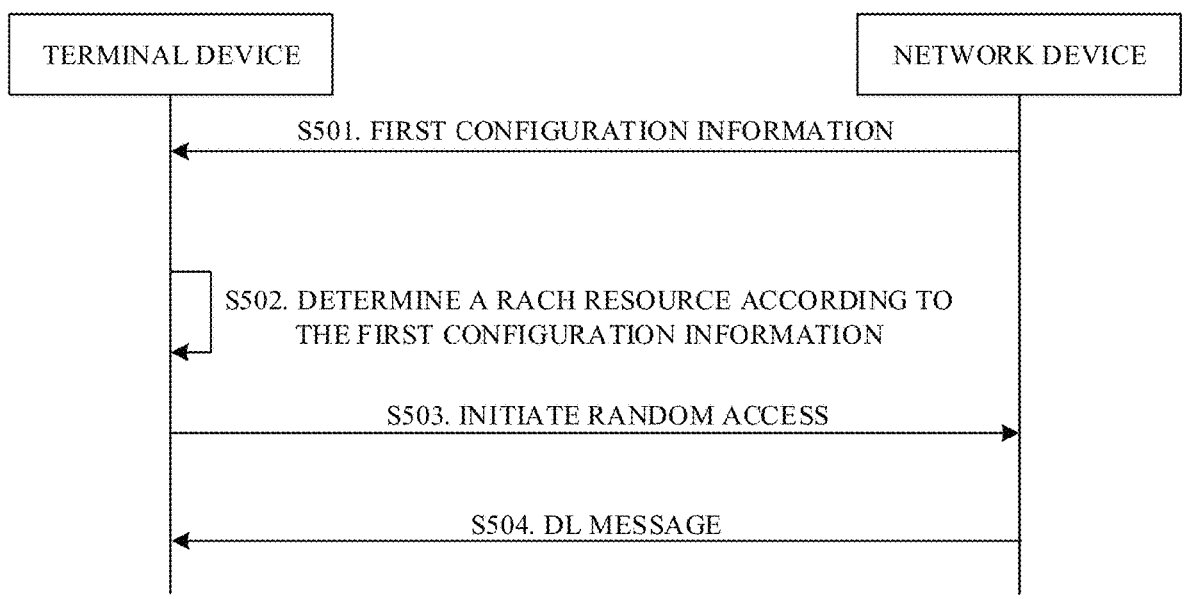
FIG. 5
FIG. 6
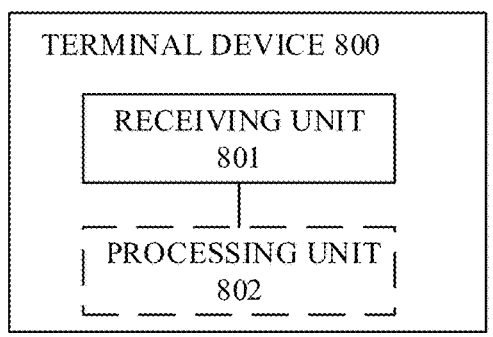
FIG. 7

METHOD FOR RANDOM ACCESS RESOURCE CONFIGURATION, TERMINAL DEVICE, AND NETWORK DEVICE

CROSS REFERENCE TO RELATED APPLICATION(S)

This application is a continuation of International Application No. PCT/CN2020/100264, filed Jul. 3, 2020, the entire disclosure of which is incorporated herein by reference.

TECHNICAL FIELD

The disclosure relates to the field of wireless communication technology, and in particular, to a method for random access resource configuration, a terminal device, and a network device.

BACKGROUND

In the related art, after a network slice is introduced at radio access network (RAN) side, the procedure of network slice-based random access channel (RACH) has not yet been determined.

SUMMARY

In a first aspect, implementations of the disclosure provide a method for random access resource configuration. The method includes the following. A terminal device receives first configuration information, where the first configuration information includes at least two random access resources associated with or corresponding to a network slice.

In a second aspect, implementations of the disclosure provide a terminal device. The terminal device includes a transceiver, a memory configured to store computer programs, and a processor configured to invoke and execute the computer programs stored in the memory to cause the transceiver to: receive first configuration information, where the first configuration information includes at least two random access resources associated with or corresponding to a network slice.

In a third aspect, implementations of the disclosure provide a network device. The network device includes a transceiver, a memory configured to store computer programs, and a processor configured to invoke and execute the computer programs stored in the memory to cause the transceiver to: transmit first configuration information to a terminal device, where the first configuration information includes at least two random access resources associated with or corresponding to a network slice.

BRIEF DESCRIPTION OF THE DRAWINGS

FIG. 5 is a schematic flowchart of another possible procedure of a method for random access resource configuration according to implementations of the disclosure.

FIG. 6 is a schematic flowchart of a detailed possible procedure of a method for random access resource configuration according to implementations of the disclosure.

FIG. 7 is a schematic diagram of a structure of a terminal device according to implementations of the disclosure.

DETAILED DESCRIPTION

Figure 1:
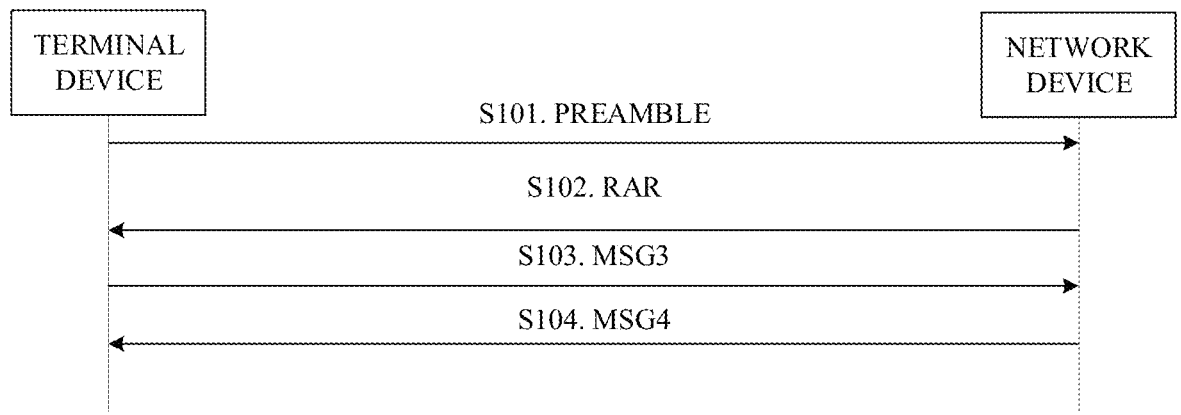
FIG. 1 is a schematic flowchart of a procedure of a second type of random access of the disclosure.

In order for better understanding of the features and technical contents of implementations of the disclosure, the implementation process of implementations of the disclosure will be described in detail below with reference to the accompanying drawings. The accompanying drawings herein are merely intended for illustration rather than limitation of implementations of the disclosure.

The related art is briefly described before a method for random access resource configuration provided in implementations of the disclosure is described in detail.

A strong demand for wireless communication in the vertical industry is obvious to all. To meet requirements of the vertical industry for delay, mobility, reliability, position accuracy, etc., a radio access network (RAN) needs to enhance the support of vertical services in the access network. One way to enhance the support of the vertical services by the access network is to provide lower latency, more targeted, more flexible, and more scalable services for various services with different requirements based on network slicing. More specifically, RAN slicing allows application (APP) providers to participate in the design, deployment, and operation of a customized RAN, to better support the services of the application providers. Therefore, release 17 (Rel-17) introduces the enhancement of slicing in the access network, which specifically involves the following aspects.

The study item aims to investigate enhancement on RAN support of network slicing. Detailed objectives of the study item are:
  1. Study mechanisms to enable user equipment (UE) fast access to the cell supporting the intended slice, including [RAN2]
  a. Slice based cell reselection under network control
  b. Slice based random access channel (RACH) configuration or access barring
  Note: whether the existing mechanism can meet this scenario or requirement can be studied.

The network slicing in release 15 (Rel-15) only involves the core network side. Specifically, a terminal device reports its own network slice requirement to a network device, and the network device selects an appropriate access and mobility management function (AMF) entity according to the network slice requirement reported by the terminal device, to establish a business session between the terminal device and the network device. In the related art, the related behavior of a network slice supported by the access network side is not involved.

In a RACH procedure, a cause value for trigger/establishment is carried in message 3 (Msg3). The random access procedure can be triggered by the following events: initial access from RRC_IDLE, radio resource control (RRC)

connection re-establishment procedure, handover, downlink (DL) or uplink (UL) data arrival during RRC_CONNECTED when UL synchronization status is "non-synchronized", UL data arrival during RRC_CONNECTED when there are no physical uplink control channel (PUCCH) resources for schedule request (SR) available, SR failure, request by RRC upon synchronous reconfiguration, transition from RRC_INACTIVE, to establish time alignment at secondary cell (SCell) addition, request for other system information (SI) (see subclause 7.3), and beam failure recovery.

In a new radio (NR) system, two random access modes are mainly supported. Therefore, the RACH procedure includes a first type of random access and a second type of random access. For the first type of random access, two information interactions need to be performed between the terminal device and the network device. Therefore, the first type of random access is also referred to as 2-step RACH. For the second type of random access, four information interactions need to be performed between the terminal device and the network device. Therefore, the second type of random access is also referred to as 4-step RACH. According to different random access modes, the random access includes contention based random access and non-contention based random access. According to different random access types, the random access includes the first type of random access and the second type of random access. The first type of random access and the second type of random access are briefly described below respectively.

As illustrated in FIG. 1, a procedure of the second type of random access includes the following four steps.

S101, a terminal device transmits a random access preamble to a network device via message 1 (Msg1).

The terminal device transmits a selected preamble on a selected physical random access channel (PRACH) time-domain resource, and according to the preamble, the network device is able to estimate a UL timing and the size of a UL grant required for the terminal device to transmit message 3 (Msg3).

S102, after detecting the preamble transmitted by the terminal device, the network device transmits a random access response (RAR) message to the terminal device via message 2 (Msg2), to inform the terminal device of information of a UL resource that can be used by the terminal device when transmitting Msg3, allocate a temporary radio network temporary identity (RNTI) for the terminal device, provide a time advance command for the terminal device, etc.

S103, after receiving the RAR message, the terminal device transmits Msg3 on the UL resource specified by the RAR message.

Msg3 is mainly used to notify the network device what event triggers the RACH procedure. For example, if the RACH procedure is triggered by an initial random access event, a terminal device identity (ID) and an establishment cause will be carried in Msg3. If the RACH procedure is triggered by an RRC reestablishment event, a connected-state terminal device ID and an establishment cause will be carried in Msg3.

The ID carried in Msg3 enables the contention conflict to be resolved at S104.

S104, the network device transmits message 4 (Msg4) to the terminal device and allocates a UL transmission resource to the terminal device, where Msg4 contains a contention resolution message.

Upon reception of Msg4 transmitted by the network device, the terminal device may check whether the UE-specific temporary ID transmitted by the terminal device in Msg3 is contained in the contention resolution message transmitted by the base station. If the temporary ID is contained in the contention resolution message, it means that the random access procedure of the terminal device succeeds, otherwise, it means that the random access procedure fails and the terminal device needs to re-initiate the random access procedure from the first step.

Msg4 is further used to transmit a radio resource control (RRC) configuration message to the terminal device.

Figure 2:
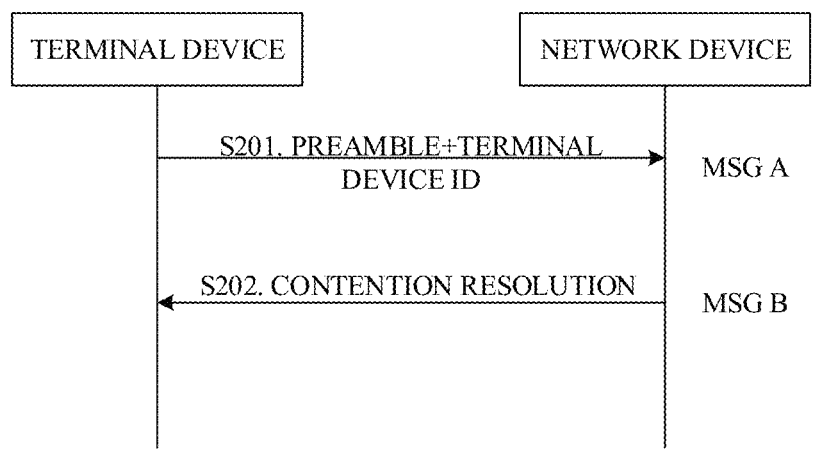
FIG. 2 is a schematic flowchart of a procedure of a first type of random access of the disclosure.

The second type of RACH is completed through four information interactions between the network device and the terminal device, which results in a long delay of the RACH procedure. To solve the problem of the long delay of the RACH procedure, the first type of random access is proposed. As illustrated in FIG. 2, a procedure of the first type of random access includes the following.

S201, a terminal device transmits message A (MsgA) to a network device.

MsgA consists of a preamble and a payload. Optionally, the preamble is the same as the preamble in the second type of random access and is transmitted on a PRACH resource. Information carried in the payload is the same as the information in Msg3 in the second type of random access and may be, for example, RRC signaling in RRC_IDLE, and a C-RNTI in RRC_CONNECTED. The payload can be transmitted on a physical uplink shared channel (PUSCH).

There are two possible results after MsgA is received by the network device. One result is that the network device successfully decodes one or more preambles. The other result is that the network device successfully decodes one or more preambles and one or more payloads.

S202, the terminal device receives message B (MsgB) transmitted by the network device.

Optionally, MsgB contains contents of Msg2 and Msg4 in the second type of random access.

To distinguish the 2-step RACH and the 4-step RACH, the network device supports two configurations of random access occasion (RO) and preamble.

One way is, a same or shared RO is configured for the 2-step RACH and the 4-step RACH, but different or separate preambles are configured for the 2-step RACH and the 4-step RACH. The network device can distinguish the type of random access selected by the terminal device according to the range of the index of the received preamble.

The other way is, separate ROs are configured for the 2-step RACH and the 4-step RACH, but a shared preamble is configured for the 2-step RACH and the 4-step RACH. The network device can distinguish the type of random access selected by the terminal device according to the time-frequency location of the received preamble.

For the 4-step RACH, after transmitting the preamble, the terminal device needs to monitor an RAR scheduled by a physical downlink control channel (PDCCH) scrambled with a random access RNTI (RA-RNTI). For the 2-step RACH, after transmitting the preamble and the payload, the terminal device needs to monitor MsgB scheduled by a PDCCH scrambled with a MsgB-RNTI. The RAR and MsgB have different media access control (MAC) protocol data unit (PDU) formats, and a R15 terminal device is not required to support interpretation of MsgB. Therefore, considering that resources will be reused for the 2-step RACH and the 4-step RACH and an offset is therefore needed to distinguish different terminal devices, in terms of reception, the MsgB-RNTI has an offset with respect to the RA-RNTI to distinguish from the RA-RNTI.

The related art does not disclose how an air interface supports network slicing, but R-17 introduces network slice-based random access. Therefore, it is necessary to determine the procedure of network slice-based random access.

The method for random access resource configuration in implementations of the disclosure are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, a wireless local area networks (WLAN), a wireless fidelity (WiFi), a next-generation communication system, or other communication systems.

Generally speaking, a conventional communication system generally supports a limited number of connections and therefore is easy to implement. However, with development of communication technology, a mobile communication system will not only support conventional communication but also support, for example, device to device (D2D) communication, machine to machine (M2M) communication, machine type communication (MTC), and vehicle to vehicle (V2V) communication. Implementations of the disclosure are also applicable to these communication systems.

The system architecture and service scenario described in implementations of the disclosure are merely intended for describing more clearly technical solutions of implementations of the disclosure, and do not constitute limitation on the technical solutions provided in implementations of the disclosure. Those of ordinary skill in the art can appreciate that, with evolution of network architectures and emergence of new service scenarios, for similar technical problems, the technical solutions provided in implementations of the disclosure can also be applied.

The network device in implementations of the disclosure may be a common base station (such as NodeB, eNB, or gNB), an NR controller, a centralized unit, an NR base station, a remote radio module, a micro base station, a relay, a distributed unit, a transmission reception point (TRP), a transmission point (TP), or any other device. The technology and form adopted by the network device are not limited in implementations of the disclosure. For the convenience of illustration, in all implementations of the disclosure, the above devices that can provide wireless communication functions for a terminal device are collectively referred to as "network device".

In implementations of the disclosure, the terminal device may be any terminal, for example, the terminal device may be a UE for MTC. In other words, the terminal device may also be referred to as UE, mobile station (MS), mobile terminal, terminal, etc. The terminal device can communicate with one or more CNs via a RAN. For example, the terminal device can be a mobile phone (or referred to as "cellular" phone), a computer with mobile terminal, etc. For example, the terminal device can also be a portable, pocket-sized, handheld, computer built-in, or in-vehicle mobile device that exchanges language and/or data with the RAN. Implementations of the disclosure are not limited in this regard.

Optionally, the network device and the terminal device can be deployed on land, which includes indoor or outdoor, handheld, or in-vehicle. The network device and the terminal device can also be deployed on water. The network device and the terminal device can also be deployed in airplanes, balloons, and satellites in the air. There is no limitation on the application scenario of the network device and the terminal device in implementations of the disclosure.

Optionally, communication between the network device and the terminal device and communication between terminal devices may be implemented in a licensed spectrum, in an unlicensed spectrum, or in both the licensed spectrum and the unlicensed spectrum. The communication between the network device and the terminal device and the communication between the terminal devices may be implemented in a spectrum below 7 gigahertz (GHz), in a spectrum above 7 GHz, or in both the spectrum below 7 GHz and the spectrum above 7 GHz. There is no limitation on a spectrum resource used between the network device and the terminal device in implementations of the disclosure.

Generally speaking, a conventional communication system generally supports a limited number of connections and therefore is easy to implement. However, with development of communication technology, a mobile communication system will not only support conventional communication but also support, for example, D2D communication, M2M communication, MTC, and V2V communication. Implementations of the disclosure are also applicable to these communication systems.

Figure 3:
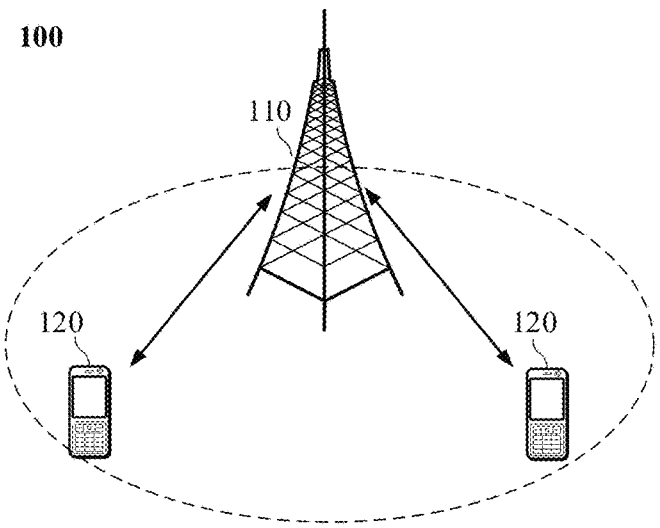
FIG. 3 is a schematic structural diagram of a communication system according to implementations of the disclosure.

Exemplarily, as illustrated in FIG. 3, a communication system 100 may include a network device 110. The network device 110 may be a device that can communicate with a terminal device 120 (or referred to as a communication terminal or a terminal). The network device 110 can provide a communication coverage for a specific geographical area and communicate with terminal devices in the coverage area. Optionally, the network device 110 may be a base transceiver station (BTS) in the GSM or in the CDMA system, or may be a NodeB (NB) in the WCDMA system, or may be an evolutional Node B (eNB or eNodeB) in the LTE system, or may be a radio controller in a cloud radio access network (CRAN). Alternatively, the network device may be a mobile switching center, a relay station, an access point, an in-vehicle device, a wearable device, a hub, a switch, a bridge, a router, a network-side device in a 5th generation (5G) network, or a network device in a future evolved public land mobile network (PLMN).

The communication system 100 further includes at least one terminal device 120 in a coverage area of the network device 110. The "terminal device" referred to herein can include but is not limited to a device configured to communicate via a wired line, another data connection/network, a wireless interface, a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of the mobile terminal may include, but are not limited to, a satellite or cellular telephone, a personal communication system (PCS) terminal that can combine a cellular radio telephone with data processing, fax, and data communication capabilities, a personal digital assistant (PDA) that can be a radio telephone, a pager, internet/intranet access, a web browser, a memo pad, a calendar, and/or a global positioning system (GPS) receiver, a conventional laptop and/or a palmtop receiver, or other electronic devices including a radiotelephone transceiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in the future evolved PLMN, etc.

Optionally, the terminal devices 120 may communicate with each other through device to device (D2D) communication.

Optionally, a 5G system or 5G network may also be referred to as a NR system or NR network.

FIG. 3 exemplarily illustrates one network device and two terminal devices. Optionally, the communication system 100 may include multiple network devices, and there may be other numbers of terminal devices in a coverage area of each of the network devices, which is not limited herein.

Optionally, the communication system 100 may further include other network entities such as a network controller, a mobility management entity, or the like, which is not limited herein.

It should be understood that, in implementations of the disclosure, a device having a communication function in a network/system may be referred to as a communication device. Taking the communication system 100 illustrated in FIG. 3 as an example, the communication device may include the network device 110 and the terminal device 120 having a communication function, and the network device 110 and the terminal device 120 may be the specific devices described above, which will not be repeated herein. The communication device may also include other devices in the communication system 100, such as a network controller, a mobility management entity, and other network entities, which is not limited herein.

Figure 4:
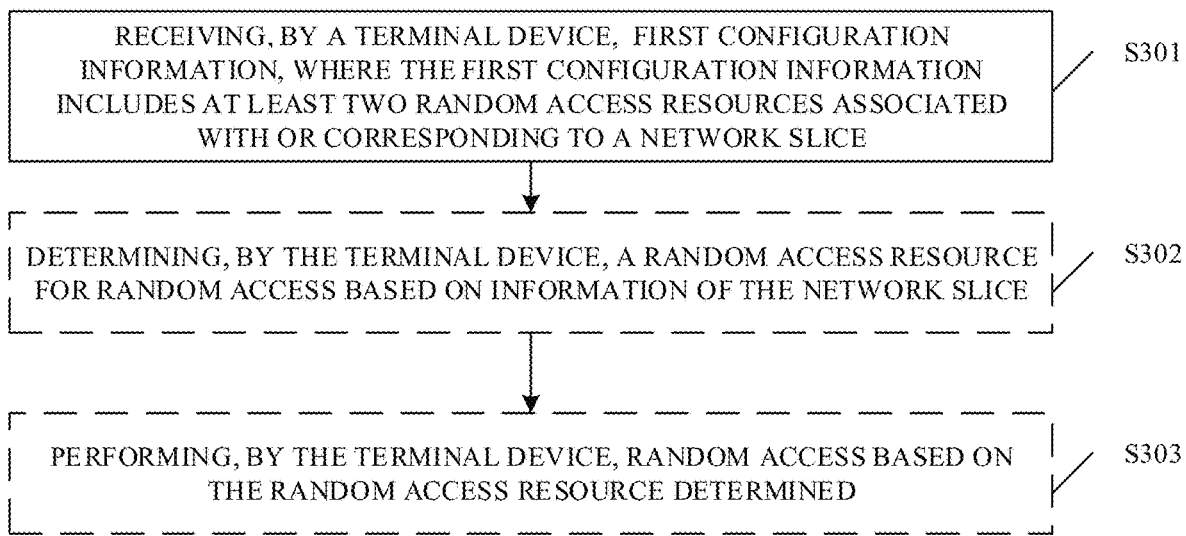
FIG. 4 is a schematic flowchart of a possible procedure of a method for random access resource configuration according to implementations of the disclosure.

As illustrated in FIG. 4, a possible procedure of a method for random access resource configuration provided in implementations of the disclosure may include the following.

S301, a terminal device receives first configuration information, where the first configuration information includes at least two random access resources associated with or corresponding to a network slice.

In some implementations, the terminal device receives the first configuration information transmitted by a network device.

In some implementations, the at least two random access resources associated with or corresponding to the network slice include a first random access resource and/or a second random access resource.

The first random access resource corresponds to a terminal device supporting a network slice, a network slice group, or a network slice type. The second random access resource corresponds to a terminal device not supporting a network slice, a network slice group, or a network slice type. The first random access resource corresponds to a terminal device supporting a network slice, a network slice group, or a network slice type as follows. The terminal device supporting a network slice, a network slice group, or a network slice type performs a random access procedure with the first random access resource. The second random access resource corresponds to a terminal device not supporting a network slice, a network slice group, or a network slice type as follows. The terminal device not supporting a network slice, a network slice group, or a network slice type performs a random access procedure with the second random access resource.

In some implementations, the first random access resource corresponds to a terminal device supporting a network slice, a network slice group, or a network slice type, which can also be understood as the first random access resource corresponds to or matches supporting a network slice, a network slice group, or a network slice type. The second random access resource corresponds to a terminal device not supporting a network slice, a network slice group, or a network slice type, which can be understood as the second random access resource corresponds to or matches not supporting a network slice, a network slice group, or a network slice type.

In some implementations, the at least two random access resources associated with or corresponding to the network slice include a first random access resource and a third random access resource. Alternatively, the at least two random access resources associated with or corresponding to the network slice include a second random access resource and a third random access resource. Alternatively, the at least two random access resources associated with or corresponding to the network slice include a first random access resource, a second random access resource, and a third random access resource. The at least two random access resources associated with or corresponding to the network slice include a third random access resource.

The third random access resource corresponds to a terminal device supporting a first network slice, a first network slice group, or a first network slice type. That is, the third random access resource corresponds to a terminal device supporting a specific network slice, a specific network slice group, or a specific type of network slice. Optionally, the third random access resource corresponds to a terminal device supporting a first network slice, a first network slice group, or a first network slice type as follow. The terminal device supporting a first network slice, a first network slice group, or a first network slice type performs a random access procedure with the third random access resource.

In some implementations, the third random access resource corresponds to a terminal device supporting a first network slice, a first network slice group, or a first network slice type, which can also be understood as the third random access resource corresponds to or matches supporting a first network slice, a first network slice group, or a first network slice type.

In some implementations, the at least two random access resources associated with or corresponding to the network slice include a first random access resource, a second random access resource, and a third random access resource.

For a scenario where the at least two random access resources associated with or corresponding to the network slice include the first random access resource and the second random access resource, configurations of the first random access resource and the second random access resource may be any of the following.

1. An RO in the first random access resource is the same as an RO in the second random access resource, and/or a preamble in the first random access resource is different from a preamble in the second random access resource. That is, the network device configures a shared RO and/or separate preambles for the first random access resource and the second random access resource.

2. The RO in the first random access resource is different from the RO in the second random access resource, and/or the preamble in the first random access resource is different from the preamble in the second random access resource. That is, the network device configures separate preambles and/or separate ROs for the first random access resource and the second random access resource.

3. The RO in the first random access resource is different from the RO in the second random access resource, and/or the preamble in the first random access resource is the same as the preamble in the second random access resource. That is, the network device configures separate ROs and/or a shared preamble for the first random access resource and the second random access resource.

In some implementations, for the first random access resource in the above three scenarios, if the terminal device supports different network slices, that is, the terminal device supports more than two network slices, different network slices supported by the terminal device correspond to different preambles in the first random access resource, and/or different network slice groups supported by the terminal device correspond to different preambles in the first random access resource, and/or different network slice types supported by the terminal device correspond to different preambles in the first random access resource. Optionally, different network slices supported by the terminal device correspond to a same RO or different ROs in the first random access resource, and/or different network slice groups supported by the terminal device correspond to a same RO or different ROs in the first random access resource, and/or different network slice types supported by the terminal device correspond to a same RO or different ROs in the first random access resource.

In other implementations, for the first random access resource in the above three scenarios, if the terminal device supports different network slices, that is, the terminal device supports more than two network slices, different network slices supported by the terminal device correspond to different ROs in the first random access resource, and/or different network slice groups supported by the terminal device correspond to different ROs in the first random access resource, and/or different network slice types supported by the terminal device correspond to different ROs in the first random access resource. Optionally, different network slices supported by the terminal device correspond to a same preamble or different preambles in the first random access resource, and/or different network slice groups supported by the terminal device correspond to a same preamble or different preambles in the first random access resource, and/or different network slice types supported by the terminal device correspond to a same preamble or different preambles in the first random access resource.

For a scenario where the at least two random access resources associated with or corresponding to the network slice include the third random access resource and the second random access resource, configurations of the second random access resource and the third random access resource may be any of the following.

4. An RO in the third random access resource is the same as an RO in the second random access resource, and/or a preamble in the third random access resource is different from a preamble in the second random access resource. That is, the network device configures a shared RO and/or separate preambles for the third random access resource and the second random access resource.

5. The RO in the third random access resource is different from the RO in the second random access resource, and/or the preamble in the third random access resource is different from the preamble in the second random access resource. That is, the network device configures separate preambles and/or separate ROs for the third random access resource and the second random access resource.

6. The RO in the third random access resource is different from the RO in the second random access resource, and/or the preamble in the third random access resource is the same as the preamble in the second random access resource. That is, the network device configures separate ROs and/or a shared preamble for the third random access resource and the second random access resource.

In some implementations, for the third random access resource in the above three scenarios, if the terminal device supports different first network slices, that is, the terminal device supports more than two specific network slices, different network slices supported by the terminal device correspond to different preambles in the third random access resource, and/or different network slice groups supported by the terminal device correspond to different preambles in the third random access resource, and/or different network slice types supported by the terminal device correspond to different preambles in the third random access resource. Optionally, if the terminal device supports more than two specific network slices, different network slices supported by the terminal device correspond to a same RO or different ROs in the third random access resource, and/or different network slice groups supported by the terminal device correspond to a same RO or different ROs in the third random access resource, and/or different network slice types supported by the terminal device correspond to a same RO or different ROs in the third random access resource.

In other implementations, for the third random access resource in the above three scenarios, if the terminal device supports different first network slices, that is, the terminal device supports more than two specific network slices, different network slices supported by the terminal device correspond to different ROs in the third random access resource, and/or different network slice groups supported by the terminal device correspond to different ROs in the third random access resource, and/or different network slice types supported by the terminal device correspond to different ROs in the third random access resource. Optionally, different network slices supported by the terminal device correspond to a same preamble or different preambles in the third random access resource, and/or different network slice groups supported by the terminal device correspond to a same preamble or different preambles in the third random access resource, and/or different network slice types supported by the terminal device correspond to a same preamble or different preambles in the third random access resource.

For a scenario where the at least two random access resources associated with or corresponding to the network slice include the third random access resource, the first random access resource, and the second random access resource, configurations of the second random access resource, the first random access resource, and the third random access resource may be any of the following.

7. An RO in the third random access resource, an RO in the first random access resource, and an RO in the second random access resource are the same, and/or a preamble in the third random access resource, a preamble in the first random access resource, and a preamble in the second random access resource are different. That is, the network device configures a shared RO and/or separate preambles for the third random access resource, the first random access resource, and the second random access resource.

8. The RO in the third random access resource, the RO in the first random access resource, and the RO in the second random access resource are different, and/or the preamble in the third random access resource, the preamble in the first random access resource, and the preamble in the second random access resource are different. That is, the network device configures separate preambles and/or separate ROs for the third random access resource, the first random access resource, and the second random access resource.

9. The RO in the third random access resource, the RO in the first random access resource, and the RO in the second random access resource are different, and/or the preamble in the third random access resource, the preamble in the first random access resource, and the preamble in the second random access resource are the same. That is, the network device configures separate ROs and/or a shared preamble for the third random access resource, the first random access resource, and the second random access resource.

In some implementations, for the third random access resource in the above three scenarios, if the terminal device supports different first network slices, that is, the terminal device supports more than two specific network slices, different network slices supported by the terminal device correspond to different preambles in the third random access resource, and/or different network slice groups supported by the terminal device correspond to different preambles in the third random access resource, and/or different network slice types supported by the terminal device correspond to different preambles in the third random access resource. Optionally, if the terminal device supports more than two specific network slices, different network slices supported by the terminal device correspond to a same RO or different ROs in the third random access resource, and/or different network slice groups supported by the terminal device correspond to a same RO or different ROs in the third random access resource, and/or different network slice types supported by the terminal device correspond to a same RO or different ROs in the third random access resource.

In other implementations, for the third random access resource in the above three scenarios, if the terminal device supports different first network slices, that is, the terminal device supports more than two specific network slices, different network slices supported by the terminal device correspond to different ROs in the third random access resource, and/or different network slice groups supported by the terminal device correspond to different ROs in the third random access resource, and/or different network slice types supported by the terminal device correspond to different ROs in the third random access resource. Optionally, different network slices supported by the terminal device correspond to a same preamble or different preambles in the third random access resource, and/or different network slice groups supported by the terminal device correspond to a same preamble or different preambles in the third random access resource, and/or different network slice types supported by the terminal device correspond to a same preamble or different preambles in the third random access resource.

In general, the first configuration information includes a network slice/network slice group/network slice type and at least two random access resources associated with or corresponding to a network slice.

In some implementations, in addition to the at least two random access resources associated with or corresponding to the network slice, the first configuration information may further include at least one of: a network slice identifier, a network slice group identifier, a network slice type identifier, a mapping between network slice identifiers and network slice groups, a mapping between network slice identifiers and network slice types, and whether a network device supports a network slice. The network slice identifier may be at least one of: single network slice selection assistance information (S-NSSAI), network slice selection assistance information (NSSAI), a network slice identifier, and a network slice identifier (NSID).

In some implementations, the first configuration information may further include at least one of: a random access priority parameter corresponding to the network slice and random access priority parameters corresponding to the random access resources. That is, different network slices or network slice groups correspond to different random access (RA) priority parameters (ra-Prioritization), or different types of RACH resources correspond to different RA priority parameters, where the RA priority parameter may include backoff and/or power ramping. Therefore, if the terminal device supports different network slices or network slice groups, the terminal device performs random access with different RA priority parameters, and when selecting different types of RACH resources to perform random access, the terminal device performs the random access with different RA priority parameters.

In some implementations, the first configuration information may further include at least one of: random access common configuration information (RACH-ConfigCommon), 2-step random access common configuration information (RACH-ConfigCommonTwoStepRA), and random access dedicated configuration information (RACH-ConfigDedicated). That is, the first configuration information is configured via at least one of: RACH-ConfigCommon, RACH-ConfigCommonTwoStepRA, and RACH-ConfigDedicated. In a specific implementation, the first configuration information may be determined according to at least one of: prach-ConfigurationIndex, msg1-FDM, msg1-Frequency Start, and totalNumberOfRA-Preambles. For example, for 4-step RACH, the first configuration information may be determined according to at least one of: prach-ConfigurationIndex, msg1-FDM, msg1-Frequency Start, and totalNumberOfRA-Preambles. For example, for 2-step RACH, the first configuration information may be determined according to at least one of: 2step prach-ConfigurationIndex, 2step msg1-FDM, 2step msg1-Frequency Start, and 2step totalNumberOfRA-Preambles. The parameters for contention free random access (CFRA) are similar, which are not listed herein.

In some implementations, the method for random access resource configuration provided in implementations of the disclosure may further include the following.

S302, the terminal device determines a random access resource for random access based on information of the network slice.

In some implementations, the information of the network slice includes at least one or more of the following: whether the terminal device supports a network slice, a network slice supported by the terminal device, a network slice group supported by the terminal device, a network slice type supported by the terminal device, a network slice selected by the terminal device, a network slice group selected by the device, a network slice type selected by the terminal device, a network slice required by the terminal device, a network slice group required by the terminal device, a network slice type required by the terminal device, a network slice expected by the terminal device, a network slice group expected by the terminal device, a network slice type expected by the terminal device, a network slice configured for the terminal device, a network slice group configured for the terminal device, a network slice type configured for the terminal device, a network slice allowed for the terminal device, a network slice group allowed for the terminal device, a network slice type allowed for the terminal device, and a network slice priority.

A specific procedure for the terminal device to determine the random access resource for random access based on the information of the network slice may include the following scenarios.

a. The terminal device determines a second random access resource as the random access resource for random access, if the terminal device does not support a network slice or a network slice of the terminal device fails to match a network slice supported by the network device. That is, if the terminal device does not support a network slice or the network slice of the terminal device fails to match the network slice supported by the network device, the terminal device performs random access with the second random access resource corresponding to not supporting or not matching a network slice.

b. The terminal device determines a first random access resource as the random access resource for random access, if the terminal device supports a network slice or the network slice of the terminal device matches the network slice supported by the network device. That is, if the terminal device supports a network slice or the network slice of the terminal device matches the network slice supported by the network device, the terminal device performs random access with the first random access resource corresponding to supporting or matching a network slice.

c. The terminal device determines a first random access resource as the random access resource for random access, if the terminal device supports a network slice and a network slice selected, required, or supported by the terminal device is configured with no corresponding first random access resource or fails to match a slice supported by a network device. For example, if the terminal device supports a network slice, even if the network slice selected, required, or supported by the terminal device is configured with no corresponding first random access resource, the terminal device still performs random access with the first random access resource corresponding to supporting or matching a network slice.

d. The terminal device determines a second random access resource as the random access resource for random access, if the terminal device supports a network slice and a network slice selected, required, or supported by the terminal device is configured with no corresponding first random access resource or fails to match a slice supported by a network device. For example, if the terminal device supports a network slice, but the network slice selected, required, or supported by the terminal device is configured with no corresponding first random access resource, the terminal device performs random access with the second random access resource corresponding to not supporting or not matching a network slice.

e. The terminal device determines a first random access resource as the random access resource for random access, if a network slice selected, required, or supported by the terminal device is configured with the corresponding first random access resource or matches a slice supported by a network device. For example, if the network slice selected, required, or supported by the terminal device is configured with corresponding one first random access resource, the terminal device performs random access with the first random access resource corresponding to supporting or matching a network slice.

f. The terminal device determines a first random access resource among at least one first random access resource as the random access resource for random access randomly, if a network slice selected, required, or supported by the terminal device is configured with the corresponding at least one first random access resource or matches a slice supported by a network device. For example, if the network slice selected, required, or supported by the terminal device is configured with corresponding two or more first random access resources, the terminal device random access with a first random access resource corresponding to supporting or matching a network slice selected randomly.

g. The terminal device determines a first random access resource with a highest priority among at least one first random access resource as the random access resource for random access, if a network slice selected, required, or supported by the terminal device is configured with the corresponding at least one first random access resource or matches a slice supported by a network device, or a network slice with a highest priority selected, required, or supported by the terminal device matches the slice supported by the network device. For example, if the network slice selected, required, or supported by the terminal device is configured with corresponding n first random access resources, the terminal device performs random access with a random access resource having the highest priority among the n random access resources.

h. The terminal device selects a third random access resource, when a network slice selected, required, or supported by the terminal device is configured with corresponding at least one third random access resource or matches a slice supported by a network device. Optionally, the third random access resource is at least one random access resource, and the at least one random access resource corresponds to at least one network slice/network slice group/network slice type. In this example, the third random access resource corresponds to at least a network slice or a network slice group selected, required, or supported by the terminal device. For example, when the network slice selected, required, or supported by the terminal device is correspondingly configured with a third random access resource, the terminal device performs random access with one third random access resource among the at least one third random access resource. For example, when the network slice selected, required, or supported by the terminal device is correspondingly configured with a third random access resource, the terminal device performs random access with one third random access resource corresponding to a network slice of the terminal device among the at least one third random access resource.

i. The terminal devices selects a third random access resource, when a network slice with a highest priority selected, required, or supported by the terminal device is configured with corresponding at least one third random access resource or matches a slice supported by a network device. Optionally, the third random access resource is at least one random access resource, and the at least one random access resource corresponds to at least one network slice/network slice group/network slice type. In this example, the third random access resource corresponds to at least a network slice or a network slice group selected, required, or supported by the terminal device. For example, when the network slice with the highest priority selected, required, or supported by the terminal device is correspondingly configured with a third random access resource, the terminal device performs random access with a third random access resource among the at least one third random access resource. For example, when the network slice with the highest priority selected, required, or supported by the terminal device is correspondingly configured with a third random access resource, the terminal device performs random access with a third random access resource corresponding the slice with the highest priority among the at least one third random access resource.

For example, the network device supports network slice 1, network slice 2, and network slice 3, where network slice 1, network slice 2, and network slice 3 each correspond to a third random access resource. Specifically, each network slice has a corresponding third random access resource. Terminal device 1 supports network slice 4, terminal device 2 supports network slice 5, terminal device 3 does not support a network slice, and terminal device 4 does not support network slice 1. Network slice 4 and network slice 5 correspond to a first random access resource, terminal device 3 performs random access with a second random access resource, and terminal device 4 performs random access with a third random access resource, for example, based on a third random access resource corresponding to network slice 1 in a third random access resource set. Terminal device 1 and terminal device 2 may perform random access with a second random access resource or a first random access resource.

In some implementations, the method for random access resource configuration provided in implementations of the disclosure may further include the following.

S303, the terminal device performs random access based on the random access resource determined.

In some implementations, the terminal device receives a DL message by adopting at least one of: different RNTI formats, different search spaces, indication information carried in an RAR, and a Msg4, when the random access resource is configured with different ROs, or the random access resource is configured with different ROs and a same preamble.

In a specific implementation, the terminal device may determine an RO location corresponding to the RAR message, indicate an RO location corresponding to the DL message received, or determine an RO location for receiving the DL message, according to the RNTI formats, the search spaces, the indication information carried in the RAR, or the Msg4.

The terminal device may determine an RO location corresponding to the RAR message, indicate an RO location corresponding to the DL message received, or determine an RO location for receiving the DL message, according to different RNTI formats, different search spaces, or different indication information carried in the RAR, where the terminal device supports different network slices.

The terminal device supporting a network slice may be the terminal device supporting different network slices or different network slice group. For example, the terminal device supporting a network slice may be UE 1 supporting network slice 1 and UE 2 supporting network slice 2.

The terminal device may determine an RO location corresponding to the RAR message, indicate an RO location corresponding to the DL message received, or determine an RO location for receiving the DL message, according to different RNTI formats, different search spaces, or different indication information carried in the RAR, where the terminal device matches different network slices.

The terminal device matching a network slice may be the terminal device matching different network slices or different network slice groups. For example, the terminal device matching a network slice may be UE 1 whose selected network slice matches a network slice supported by the network (network slice 1) and UE 2 whose selected network slice matches a network slice supported by the network (network slice 2).

In some implementations, when the terminal device receives the DL message by adopting different RNTI formats, the terminal device receives the DL message based on a first RNTI format, where the terminal device supports a network slice, and/or the terminal device receives the DL message based on a second RNTI format, where the terminal device does not support a network slice, where the first RNTI format is different from the second RNTI format, and an RO corresponding to the first RNTI format is different from an RO corresponding to the second RNTI format.

In some implementations, when the terminal device receives the DL message by adopting different RNTI formats, the terminal device whose selected network slice matches a network slice supported by the network device receives the DL message based on a first RNTI format, and/or the terminal device whose selected network slice fails to match the network slice supported by the network device receives the DL message based on a second RNTI format, where the first RNTI format is different from the second RNTI format, and an RO corresponding to the first RNTI format is different from an RO corresponding to the second RNTI format.

For example, for 4-step RACH, an RA-RNTI format different from the related art can be used. For example, an offset may be added to an existing RNTI calculation formula, an RA-RNTI format with an offset is the first RNTI format, and an RA-RNTI format without an offset is the second RNTI format. A terminal device not supporting a network slice adopts the second RNTI format, and a terminal device supporting a slice adopts the first RNTI format added with an offset. Alternatively, a terminal device not supporting a network slice adopts the first RNTI format added with an offset, and a terminal device supporting a slice adopts the second RNTI format. The terminal device distinguishes different RO locations according to different RNTI formats, to receive and detect an RAR. Exemplarily, the offset value is $14 \times 80 \times 8 \times 2$. RNTI=$1+s\_id+14 \times t\_id+14 \times 80 \times f\_id+14 \times 80 \times 8 \times ul\_carrier\_id+14 \times 80 \times 8 \times 2$. A terminal device supporting a network slice includes a terminal device supporting different network slices, a terminal device supporting different network slice groups, a terminal device matching different network slices, or a terminal device matching different network slice groups. An RNTI format is obtained by adding an offset to the existing RNTI calculation formula. In a specific implementation, the value range of f_id in the RNTI calculation formula can be extended, and different value ranges represent different RO locations.

The 4-step RACH is described above as an example, where the terminal device receives the DL message by adopting different RNTI formats. A processing procedure where the terminal device receives the DL message by adopting different RNTI formats in the 2-step RACH is the same as the 4-step RACH, which will not be repeated herein.

In other implementations, when the terminal device receives the DL message by adopting different search spaces, the terminal device receives the DL message in a first search space, where the terminal device supports a network slice, and/or the terminal device receives the DL message in a second search space, where the terminal device does not support a network slice, where the first search space is different from the second search space.

For example, for 4-step RACH, the DL message may be received based on different search spaces. Optionally, different search space IDs configured in PDCCH-Configcommon, or configured in RACH-ConfigCommon or RACH-ConfigDedicated configured in a RACH configuration correspond to different search spaces. Different search space IDs are used to distinguish different RO locations. For example, a terminal device supporting a network slice receives a PDCCH in a search space corresponding to search space ID x, and a terminal device not supporting a network slice receives a PDCCH in a search space corresponding to search space ID y. Alternatively, a terminal device supporting a network slice receives a PDCCH in the search space corresponding to search space ID y, and a terminal device not support a network slice receives a PDCCH in the search space corresponding to search space ID x. The terminal device supporting a network slice includes a terminal device supporting different network slices, a terminal device supporting different network slice groups, a terminal device matching different network slices, or a terminal device matching different network slice groups.

The 4-step RACH is described above as an example, where the terminal device receives the DL message by adopting different search spaces. A processing procedure where the terminal device receives the DL message by adopting different search spaces in the 2-step RACH is the same as the 4-step RACH, which will not be repeated herein.

In other implementations, when the terminal device determines an RO location or receives the DL message by adopting the indication information carried in the RAR, when first bit information in the indication information has a first value, the indication information indicates a first RO group and/or when the first bit information in the indication information has a second value, the indication information indicates a second RO group, or when the first bit information in the indication information has the second value, the indication information indicates the first RO group and/or when the first bit information in the indication information has the first value, the indication information indicates the second RO group. The first value is different from the second value. The first RO group is also different from the second RO group. The first RO group is different from the second RO group in that ROs in the first RO group are not exactly the same as ROs in the second RO group.

For example, for 4-step RACH, indication information may be carried in the RAR to indicate RO group information. Exemplarily, the RO group information can be indicated in a reserved bit or by reusing other information bits. For example, when the reserved bit has a first value (e.g., the first value is 0), it represents an RO with a smaller RO frequency start location index, and when the reserved bit has a second value (e.g., the second value is 1), it represents an RO with a larger RO frequency start location index. For another example, when the reserved bit has the first value (e.g., the first value is 0), it represents an RO location not supporting a network slice, and when the reserved bit has the second value (e.g., the second value is 1), it represents an RO location supporting a network slice. For another example, when the reserved bit is 0, it means that other information bits are not reused, and original information bits are used for interpretation, and when the reserved bit is 1, it means that other information bits are reused, and new information bits are used for interpretation. When the last bit of a UL-grant is 0, it represents an RO with a smaller RO frequency start location index, and when the last bit of the UL-grant is 1, it represents an RO with a larger RO frequency start location index. Alternatively, when the last bit of the UL-grant is 0, it represents an RO location not supporting a network slice, and when the last bit of the UL-grant is 1, it represents an RO location supporting a network slice. If the last two bits in the UL-grant represent the RO group information, when the last two bits are 00, it represents an RO with the smallest RO frequency start location index, when the last two bits are 01, it represents an RO with the second smallest RO frequency start location index, and when the last two bits are 11, it represents an RO with the largest RO frequency start location index.

For example, for 4-step RACH, indication information may be carried in the RAR to indicate the RO group information. Exemplarily, different RAR subheaders are used to indicate different RO groups. For example, an existing RAR subheader indicates an RO location not supporting a slice, and a new RAR subheader indicates an RO location supporting a slice. For 2-step RACH, an RO may be indicated in the same or similar manner as 4-step RACH.

In other implementations, the terminal device determines an RO/UE for contention resolution according to Msg4 received. For example, for 4-step RACH, the RO/UE can be finally determined through the reception of Msg4. That is, if ROs selected by UE 1 and UE 2 in different RO groups correspond to a same RNTI, after receiving Msg2, UE 1 and UE 2 each transmit Msg3, and finally determine the UE/RO for contention resolution according to Msg4 received.

As illustrated in FIG. 5, another possible procedure of a method for random access resource configuration provided in implementations of the disclosure may include the following.

S401, a network device transmits first configuration information to a terminal device, where the first configuration information includes at least two random access resources associated with or corresponding to a network slice.

Relevant description for the first configuration information is the same as relevant description for the first configuration information in S201 of foregoing implementations, which will not be repeated herein.

A method for random access resource configuration provided in implementations of the disclosure will be described in detail below by taking an example that the network device configures a first random access resource and a second random access resource for the terminal device. As illustrated in FIG. 6, a detailed possible procedure of a method for random access resource configuration provided in implementations of the disclosure may include the following.

S501, a network device configures first configuration information for a terminal device.

In some implementations, the first configuration information includes at least two random access resources associated with or corresponding to a network slice. The at least two random access resources associated with or corresponding to the network slice include a first random access resource and/or a second random access resource.

The first random access resource corresponds to a terminal device supporting a network slice, a network slice group, or a network slice type. The second random access resource corresponds to a terminal device not supporting a network slice, a network slice group, or a network slice type. The first random access resource corresponds to a terminal device supporting a network slice, a network slice group, or a network slice type as follows. The terminal device supporting a network slice, a network slice group, or a network slice type performs a random access procedure with the first random access resource. The second random access resource corresponds to a terminal device not supporting a network slice, a network slice group, or a network slice type as follows. The terminal device not supporting a network slice, a network slice group, or a network slice type performs a random access procedure with the second random access resource.

In some implementations, the first random access resource corresponds to a terminal device supporting a network slice, a network slice group, or a network slice type, which can also be understood as the first random access resource corresponds to or matches supporting a network slice, a network slice group, or a network slice type. The second random access resource corresponds to a terminal device not supporting a network slice, a network slice group, or a network slice type, which can be understood as the second random access resource corresponds to or matches not supporting a network slice, a network slice group, or a network slice type.

In conclusion, in this implementation, the random access resource configured by the network device for the terminal device include two types, one is the first random access resource corresponding to a terminal device supporting a network slice, and the other is the second random access resource corresponding to a terminal device not supporting a network slice. It should be noted that as long as the terminal device supports a network slice, the terminal device can perform a random access procedure with the first random access resource regardless of which kind or type of network slice the terminal device supports.

For example, the network device configures RACH resource a, and RACH resource a corresponds to a scenario where a network slice (or a network slice group/network slice type) is supported. Correspondingly, a terminal device supporting a network slice (or a network slice group/network slice type) selects a RACH resource in or corresponding to RACH resource a. The network device configures RACH resource b, and RACH resource b corresponds to a scenario where a slice (or a slice group/slice type) is not supported. Correspondingly, a terminal device not supporting a network slice (or a network slice group/network slice type) selects a RACH resource in or corresponding to RACH resource b.

In the first configuration information, an RO in the first random access resource may be the same as an RO in the second random access resource, and/or a preamble in the first random access resource may be different from a preamble in the second random access resource.

Alternatively, in the first configuration information, the RO in the first random access resource may be different from the RO in the second random access resource, and/or the preamble in the first random access resource may be different from the preamble in the second random access resource.

Alternatively, in the first configuration information, the RO in the first random access resource may be different from the RO in the second random access resource; and/or the preamble in the first random access resource may be the same as the preamble in the second random access resource.

Alternatively, in the first configuration information, if the terminal device supports different network slices, that is, the terminal device supports more than two network slices, different network slices supported by the terminal device correspond to different preambles in the first random access resource, and/or different network slice groups supported by the terminal device correspond to different preambles in the first random access resource, and/or different network slice types supported by the terminal device correspond to different preambles in the first random access resource. For example, the terminal device supports network slice 1 and network slice 2, and a preamble in the first random access resource corresponding to network slice 1 is different from a preamble in the first random access resource corresponding to network slice 2. Correspondingly, different network slices supported by the terminal device correspond to a same RO or different ROs in the first random access resource, and/or different network slice groups supported by the terminal device correspond to a same RO or different ROs in the first random access resource, and/or different network slice types supported by the terminal device correspond to a same RO or different ROs in the first random access resource. For example, the terminal device supports network slice 1 and network slice 2, and an RO in the first random access resource corresponding to network slice 1 is the same as or different from an RO in the first random access resource corresponding to network slice 2.

Alternatively, in the first configuration information, if the terminal device supports different network slices, that is, the terminal device supports more than two network slices, different network slices supported by the terminal device correspond to different ROs in the first random access resource, and/or different network slice groups supported by the terminal device correspond to different ROs in the first random access resource, and/or different network slice types supported by the terminal device correspond to different ROs in the first random access resource. For example, the terminal device supports network slice 1 and network slice 2, and the RO in the first random access resource corresponding to network slice 1 is different from the RO in the first random access resource corresponding to network slice 2. Correspondingly, different network slices supported by the terminal device correspond to a same preamble or different preambles in the first random access resource, and/or different network slice groups supported by the terminal device correspond to a same preamble or different preambles in the first random access resource, and/or different network slice types supported by the terminal device correspond to a same preamble or different preambles in the first random access resource. For example, the terminal device supports network slice 1 and network slice 2, and the preamble in the first random access resource corresponding to network slice 1 is the same as or different from the preamble in the first random access resource corresponding to network slice 2.

The first configuration information may further include: a network slice identifier, a network slice group identifier, a network slice type identifier, a mapping between network slice identifiers and network slice groups, a mapping between network slice identifiers and network slice types, and whether a network device supports a network slice. The network slice identifier may be at least one of: S-NSSAI, NSSAI, a network slice identifier, and an NSID.

The first configuration information may further include: a random access priority parameter corresponding to the network slice and random access priority parameters corresponding to the random access resources. That is, different network slices or network slice groups correspond to different RA priority parameters, or different types of RACH resources correspond to different RA priority parameters, where the RA priority parameter may include backoff and/or power ramping. Therefore, if the terminal device supports different network slices or network slice groups, the terminal device performs random access with different RA priority parameters, and when selecting different types of RACH resources to perform random access, the terminal device performs the random access with different RA priority parameters.

In some implementations, the first configuration information may further include at least one of: RACH-ConfigCommon, RACH-ConfigCommonTwoStepRA, and RACH-ConfigDedicated. That is, the first configuration information is configured via at least one of: RACH-ConfigCommon, RACH-ConfigCommonTwoStepRA, and RACH-ConfigDedicated. In a specific implementation, the first configuration information may be determined according to at least one of: prach-ConfigurationIndex, msg1-FDM, msg1-Frequency Start, and totalNumberOfRA-Preambles. For example, for 4-step RACH, the first configuration information may be determined according to at least one of: prach-ConfigurationIndex, msg1-FDM, msg1-Frequency Start, and totalNumberOfRA-Preambles. For example, for 2-step RACH, the first configuration information may be determined according to at least one of: 2step prach-ConfigurationIndex, 2step msg1-FDM, 2step msg1-FrequencyStart, and 2step totalNumberOfRA-Preambles. The parameters for CFRA are similar, which are not listed herein.

The random access resource may include an RO and/or a preamble. In some implementations, an RO in the first random access resource is the same as an RO in the second random access resource, and/or a preamble in the first random access resource is different from a preamble in the second random access resource. That is, the network device configures a shared RO and/or separate preambles for the first random access resource and the second random access resource.

Alternatively, the RO in the first random access resource is different from the RO in the second random access resource, and/or the preamble in the first random access resource is different from the preamble in the second random access resource. That is, the network device configures separate preambles and/or separate ROs for the first random access resource and the second random access resource.

Alternatively, the RO in the first random access resource is different from the RO in the second random access resource, and/or the preamble in the first random access resource is the same as the preamble in the second random access resource. That is, the network device configures separate ROs and/or a shared preamble for the first random access resource and the second random access resource.

S502, the terminal device determines a RACH resource according to the first configuration information.

In some implementations, the information of the network slice includes at least one or more of the following: whether the terminal device supports a network slice, a network slice supported by the terminal device, a network slice group supported by the terminal device, a network slice type supported by the terminal device, a network slice selected by the terminal device, a network slice group selected by the device, a network slice type selected by the terminal device, a network slice required by the terminal device, a network slice group required by the terminal device, a network slice type required by the terminal device, a network slice expected by the terminal device, a network slice group expected by the terminal device, a network slice type expected by the terminal device, a network slice configured for the terminal device, a network slice group configured for the terminal device, a network slice type configured for the terminal device, a network slice allowed for the terminal device, a network slice group allowed for the terminal device, a network slice type allowed for the terminal device, and a network slice priority.

In a specific implementation, the terminal device determines a second random access resource as the random access resource for random access, if the terminal device does not support a network slice or a network slice of the terminal device fails to match a network slice supported by the network device. That is, if the terminal device does not support a network slice or the network slice of the terminal device fails to match the network slice supported by the network device, the terminal device performs random access with the second random access resource corresponding to not supporting or not matching a network slice. The terminal device determines a first random access resource as the random access resource for random access, if the terminal device supports a network slice or the network slice of the terminal device matches the network slice supported by the network device. That is, if the terminal device supports a network slice or the network slice of the terminal device matches the network slice supported by the network device, the terminal device performs random access with the first random access resource corresponding to supporting or matching a network slice.

S503, the terminal device initiates random access.

In some implementations, when the network device configures the random access resource for the terminal device, the network device configures a shared RO and different preambles (or separate preambles) for a scenario where a network slice is supported and a scenario where a network slice is not supported. Then, a UE supporting a network slice and a UE not supporting a network slice can select PRACH resources in the shared RO, but need to select preamble resources in their respective preamble groups.

In other implementations, when the network device configures the random access resource for the terminal device, the network device configures separate ROs and different preambles (or separate preambles) for a scenario where a network slice is supported and a scenario where a slice is not supported. A UE supporting a network slice and a UE not supporting a network slice select PRACH resources in different RO groups and preamble resources in different preamble groups.

In other implementations, when the network device configures the random access resource for the terminal device, the network device configures separate ROs and a shared preamble for a scenario where a network slice is supported and a scenario where a network slice is not supported. A UE supporting a network slice and a UE not supporting a network slice select PRACH resources in different RO groups and preamble resources in the same preamble group.

S504, the network device transmits a DL message to the terminal device.

In some implementations, the network device receives an UL message transmitted by the terminal device, and feeds back for the UL message, that is, transmits a DL message corresponding to the UL message to the terminal device.

In some implementations, the UL message may be message 1 (Msg1) or MsgA. Correspondingly, the DL message may be Msg2 or MsgB. If the UL message is Msg1, the terminal device detects Msg2 in an RAR window by using an RA-RNTI. If the UL message is MsgA, the terminal device detects MsgB in the RAR window by using MsgB-RNTI.

When separate ROs are supported, the terminal device can receive the DL message in any of the following manners, so that the terminal device can distinguish which RO the DL message is fed back for. Different RNTI formats can be used, for example, an RAR can be received and detected by using an existing RNTI calculation formula added with an offset, or the value range of f_id in the RNTI calculation formula can also be extended, and different value ranges represent different RO locations. Different search spaces can be used, for example, the RAR can be received and detected by using search spaces corresponding to different search space IDs, where the search space IDs can be configured in an RACH configuration such as RACH-ConfigCommon or RACH-ConfigDedicated, or can be configured in PDCCH-Config-Common. Indication information may further be added to the RAR, for example, by using a reserved bit in the RAR, or reusing other information bits (such as several bits in information bits of a UL-grant) to indicate the RO. Which RO and/or terminal device the RAR is targeted for can be finally determined by the reception of Msg4. The following takes the shared preamble as an example for illustration.

1. For 4-step RACH, different RA-RNTI formats can be used, for example, an existing RNTI calculation formula may be added with an offset to distinguish from an existing RA-RNTI format. An RAR transmitted to a terminal device not supporting a network slice adopts the existing RA-RNTI format, and an RAR transmitted to a terminal device supporting a network slice adopts an RA-RNTI format added with an offset to distinguish different RO locations. Exemplarily, the offset value is 14×80×8×2. RNTI=1+s_id+14×t_id+14×80×f_id+14×80×8×ul_carrier_id+14×80×8×2. The 4-step RACH is described above as an example, where the terminal device receives the DL message by adopting different RNTI formats. A processing procedure where the terminal device receives the DL message by adopting different RNTI formats in the 2-step RACH is the same as the 4-step RACH, which will not be repeated herein.

2. For 4-step RACH, different search spaces can be used. Different search space IDs may be used to distinguish different RO locations. For example, a terminal device supporting a network slice receives a PDCCH in a search space corresponding to search space ID 1, and a terminal device not supporting a network slice receives a PDCCH in a search space corresponding to search space ID 2. The 4-step RACH is described above as an example, where the terminal device receives the DL message by adopting different search spaces. A processing procedure where the terminal device receives the DL message by adopting different search spaces in the 2-step RACH is the same as the 4-step RACH, which will not be repeated herein.

3. For 4-step RACH, indication information may be carried in the RAR to indicate RO group information. Exemplarily, the RO group information can be indicated in a reserved bit or by reusing other information bits. When the reserved bit is 0, it represents an RO with a smaller RO frequency start location index, and when the reserved bit is 1, it represents an RO with a larger RO frequency start location index. For another example, when the reserved bit is 0, it represents an RO location not supporting a slice, and when the reserved bit is 1, it represents an RO location supporting a slice. For another example, when the reserved bit is 0, it means that other information bits are not reused, and original information bits are used for interpretation, and when the reserved bit is 1, it means that other information bits are reused, and new information bits are used for interpretation. For example, when the last bit of a UL-grant is 0, it represents an RO with a smaller RO frequency start location index, and when the last bit of the UL-grant is 1, it represents an RO with a larger RO frequency start location index. Alternatively, when the last bit of the UL-grant is 0, it represents an RO location not supporting a slice, and when the last bit of the UL-grant is 1, it represents an RO location supporting a slice. If the last two bits in the UL-grant represent the RO group information, when the last two bits in the UL-grant are 00, it represents an RO with the smallest RO frequency start location index, when the last two bits in the UL-grant are 01, it represents an RO with the second smallest RO frequency start location index, and when the last two bits in the UL-grant are 11, it represents an RO with the largest RO frequency start location index.

4. For 4-step RACH, a targeted UE or RO can be finally determined according to Msg4 received. If ROs selected by terminal device 1 and terminal device 2 in different RO groups correspond to a same RNTI, after receiving Msg2, terminal device 1 and terminal device 2 each transmit Msg3 to the network device, and finally determine the UE/RO for contention resolution according to Msg4 received.

In implementations of the disclosure, by configuring the first random access resource and the second random access resource for the terminal device, the network device can determine network slice information or network slice requirement of the terminal device as soon as possible to assist the network device in access control, thereby ensuring that a terminal device with random access requirement has a priority of access.

A method for random access resource configuration provided in implementations of the disclosure will be described in detail below by taking an example that the network device configures a third random access resource and a second random access resource for the terminal device. Another detailed possible procedure of a method for random access resource configuration provided in implementations of the disclosure may include the following.

S601, a network device configures first configuration information for a terminal device.

In some implementations, the first configuration information includes at least two random access resources associated with or corresponding to a network slice. The at least two random access resources associated with or corresponding to the network slice include a third random access resource and/or a second random access resource.

The third random access resource corresponds to a terminal device supporting a first network slice, a first network slice group, or a first network slice type. That is, the third random access resource corresponds to a terminal device supporting a specific network slice, a specific network slice group, or a specific type of network slice. Optionally, the third random access resource corresponds to a terminal device supporting a first network slice, a first network slice group, or a first network slice type as follow. The terminal device supporting a first network slice, a first network slice group, or a first network slice type performs a random access procedure with the third random access resource. The third random access resource is at least one random access resource, and the at least one random access resource corresponds to at least one network slice/network slice group/network slice type. In this example, the third random access resource corresponds to at least a network slice or a network slice group selected, required, or supported by the terminal device.

In some implementations, the third random access resource corresponds to a terminal device supporting a first network slice, a first network slice group, or a first network slice type, which can also be understood as the third random access resource corresponds to or matches supporting a first network slice, a first network slice group, or a first network slice type.

In some implementations, the second random access resource corresponds to a terminal device not supporting a network slice, a network slice group, or a network slice type as follows. The terminal device not supporting a network slice, a network slice group, or a network slice type performs a random access procedure with the second random access resource, which can also be understood as the second random access resource corresponds to a terminal device not supporting a network slice, a network slice group, or a network slice type, or understood as the second random access resource corresponds to or matches not supporting a network slice, a network slice group, or a network slice type.

In conclusion, in this implementation, the random access resources configured by the network device for the terminal device include two types, one is the third random access resource corresponding to a terminal device supporting multiple specific network slices (e.g., supporting specific network slice 1 and/or specific network slice 2), and the other is the second random access resource corresponding to a terminal device not supporting a network slice. It should be noted that, in implementations of the disclosure, only when the terminal device supports a specific kind or type of network slice, the terminal device can perform a random access procedure with the third random access resource.

For example, the network device configures RACH resource c, and RACH resource c corresponds to a scenario where specific network slice 1 (or specific network slice group 1/network slice type 1) is supported. Correspondingly, a terminal device supporting specific network slice 1 (or specific network slice group 1/specific network slice type 1) selects a RACH resource in or corresponding to RACH resource c. The network device configures RACH resource e, and RACH resource e corresponds to a scenario where specific network slice 2 (or specific network slice group 2/network slice type 2) is supported. Correspondingly, a terminal device supporting specific network slice 2 (or specific network slice group 2/specific network slice type 2) selects a RACH resource in or corresponding to RACH resource e. The network device configures RACH resource f, and RACH resource f corresponds to a scenario where specific network slice 3 (or specific network slice group 3/network slice type 3) is supported. Correspondingly, a terminal device supporting specific network slice 3 (or specific network slice group 3/specific network slice type 3) selects a RACH resource in or corresponding to RACH resource f. The network device configures RACH resource d, and RACH resource d corresponds to a scenario where a slice (or a network slice group/network slice type) is not supported. Correspondingly, a terminal device not supporting a network slice (or a network slice group/network slice type) selects a RACH resource in or corresponding to RACH resource d.

In the first configuration information, an RO in the third random access resource may be the same as an RO in the second random access resource, and/or a preamble in the third random access resource may be different from a preamble in the second random access resource.

Alternatively, in the first configuration information, the RO in the third random access resource may be different from the RO in the second random access resource, and/or the preamble in the third random access resource may be different from the preamble in the second random access resource.

Alternatively, in the first configuration information, the RO in the third random access resource may be different from the RO in the second random access resource, and/or the preamble in the third random access resource may be the same as the preamble in the second random access resource.

Alternatively, in the first configuration information, different network slices supported by the terminal device correspond to different preambles in the third random access resource, and/or different network slice groups supported by the terminal device correspond to different preambles in the third random access resource, and/or different network slice types supported by the terminal device correspond to different preambles in the third random access resource. For example, the terminal device supports network slice 1 and network slice 2, and a preamble in the third random access resource corresponding to network slice 1 is different from a preamble in the third random access resource corresponding to network slice 2. Correspondingly, in the first configuration information, different network slices supported by the terminal device correspond to a same RO or different ROs in the third random access resource, and/or different network slice groups supported by the terminal device correspond to a same RO or different ROs in the third random access resource, and/or different network slice types supported by the terminal device correspond to a same RO or different ROs in the third random access resource. For example, the terminal device supports network slice 1 and network slice 2, and an RO in the third random access resource corresponding to network slice 1 is the same as or different from an RO in the third random access resource corresponding to network slice 2.

Alternatively, in the first configuration information, different network slices supported by the terminal device correspond to different ROs in the third random access resource, and/or different network slice groups supported by the terminal device correspond to different ROs in the third random access resource, and/or different network slice types supported by the terminal device correspond to different ROs in the third random access resource. For example, the terminal device supports network slice 1 and network slice 2, and the RO in the third random access resource corresponding to network slice 1 is different from the RO in the third random access resource corresponding to network slice 2. Correspondingly, in the first configuration information, different network slices supported by the terminal device correspond to a same preamble or different preambles in the third random access resource, and/or different network slice groups supported by the terminal device correspond to a same preamble or different preambles in the third random access resource, and/or different network slice types supported by the terminal device correspond to a same preamble or different preambles in the third random access resource. For example, the terminal device supports network slice 1 and network slice 2, and the preamble in the third random access resource corresponding to network slice 1 is the same as or different from the preamble in the third random access resource corresponding to network slice 2.

The first configuration information may also include: a network slice identifier, a network slice group identifier, a network slice type identifier, a mapping between network slice identifiers and network slice groups, a mapping between network slice identifiers and network slice types, and whether a network device supports a network slice. The network slice identifier may be at least one of: S-NSSAI, NSSAI, a network slice identifier, and an NSID.

The first configuration information may further include: a random access priority parameter corresponding to the network slice and random access priority parameters corresponding to the random access resources. That is, different network slices or network slice groups correspond to different RA priority parameters, or different types of RACH resources correspond to different RA priority parameters, where the RA priority parameter may include backoff and/or power ramping. Therefore, if the terminal device supports different network slices or network slice groups, the terminal device performs random access with different RA priority parameters, and when selecting different types of RACH resources to perform random access, the terminal device performs the random access with different RA priority parameters.

In some implementations, the first configuration information may further include at least one of: RACH-ConfigCommon, RACH-ConfigCommonTwoStepRA, and RACH-ConfigDedicated. That is, the first configuration information is configured via at least one of: RACH-ConfigCommon, RACH-ConfigCommonTwoStepRA, and RACH-ConfigDedicated. In a specific implementation, the first configuration information may be determined according to at least one of: prach-ConfigurationIndex, msg1-FDM, msg1-Frequency Start, and totalNumberOfRA-Preambles. For example, for 4-step RACH, the first configuration information may be determined according to at least one of: prach-ConfigurationIndex, msg1-FDM, msg1-Frequency Start, and totalNumberOfRA-Preambles. For example, for 2-step RACH, the first configuration information may be determined according to at least one of: 2step prach-ConfigurationIndex, 2step msg1-FDM, 2step msg1-FrequencyStart, and 2step totalNumberOfRA-Preambles. The parameters for CFRA are similar, which are not listed herein.

The random access resource may include an RO and/or a preamble. In some implementations, an RO in the third random access resource is the same as an RO in the second random access resource, and/or a preamble in the third random access resource is different from a preamble in the second random access resource. That is, the network device configures a shared RO and/or separate preambles for the third random access resource and the second random access resource.

Alternatively, the RO in the third random access resource is different from the RO in the second random access resource, and/or the preamble in the third random access resource is different from the preamble in the second random access resource. That is, the network device configures separate preambles and/or separate ROs for the third random access resource and the second random access resource.

Alternatively, the RO in the third random access resource is different from the RO in the second random access resource, and/or the preamble in the third random access resource is the same as the preamble in the second random access resource. That is, the network device configures separate ROs and/or a shared preamble for the third random access resource and the second random access resource.

S602, the terminal device determines a RACH resource according to the first configuration information.

In some implementations, the information of the network slice includes at least one or more of the following: whether the terminal device supports a network slice, a network slice supported by the terminal device, a network slice group supported by the terminal device, a network slice type supported by the terminal device, a network slice selected by the terminal device, a network slice group selected by the device, a network slice type selected by the terminal device, a network slice required by the terminal device, a network slice group required by the terminal device, a network slice type required by the terminal device, a network slice expected by the terminal device, a network slice group expected by the terminal device, a network slice type expected by the terminal device, a network slice configured for the terminal device, a network slice group configured for the terminal device, a network slice type configured for the terminal device, a network slice allowed for the terminal device, a network slice group allowed for the terminal device, a network slice type allowed for the terminal device, and a network slice priority.

In a specific implementation, the terminal device determines a second random access resource as the random access resource for random access, if the terminal device does not support a network slice or a network slice of the terminal device fails to match a network slice supported by the network device. That is, if the terminal device does not support a network slice or the network slice of the terminal device fails to match the network slice supported by the network device, the terminal device performs random access with the second random access resource corresponding to not supporting or not matching a network slice. The terminal device determines a third random access resource corresponding to a specific network slice (e.g., network slice b) as the random access resource for random access, when the terminal device supports the specific network slice (e.g., network slice b) or the specific network slice (e.g., network slice b) of the terminal device matches the network slice supported by the network device. That is, if the terminal device supports network slice b or network slice b of the terminal device matches the network slice supported by the network device, the terminal device performs random access with the third random access resource corresponding to supporting or matching network slice b.

The following is an example for selection of a random access resource.

If the terminal device determines according to its own capability that it does not support a network slice, the terminal device selects a RACH resource or a RACH resource set corresponding to a type of not supporting a network slice. If the terminal device determines according to its own capability that it supports a network slice, the terminal device selects a RACH resource or a RACH resource set corresponding to a type of supporting a network slice. If the terminal device determines according to its own capability that it supports a network slice, but a network slice selected/required/supported by the terminal device is configured with no corresponding RACH resource, the terminal device selects a RACH resource or a RACH resource set corresponding to the type of supporting a network slice. If the terminal device determines according to its own capability that it supports a network slice, but a network slice selected/required/supported by the terminal device is configured with no corresponding RACH resource, the terminal device selects a RACH resource or a RACH resource set corresponding to the type of not supporting a network slice. If the terminal device determines according to its own capability that it supports a network slice, and the slice selected/required/supported by the terminal device is network slice 1, the terminal device selects a RACH resource or a RACH resource set corresponding to network slice 1. If the terminal device determines according to its own capability that it supports a network slice, and the network slice selected/required/supported by the terminal device is network slice 1 and network slice 2, the terminal device randomly selects a network slice, such as a RACH resource or a RACH resource set corresponding to network slice 1. If the terminal device determines according to its own capability that it supports a network slice, the network slice selected/required/supported by the terminal device is network slice 1 and network slice 2, and network slice 1 has a higher priority, the terminal device selects a RACH resource or a RACH resource set corresponding to network slice 1.

S603, the terminal device initiates random access.

In some implementations, during resource configuration, the network device configures a shared RO and separate preambles for at least one of: a terminal device not supporting a network slice and a terminal device supporting a network slice/network slice group. For example, a terminal device not supporting a network slice, a terminal device supporting network slice 1, and a terminal device supporting network slice 2 can select PRACH resources in the shared RO, but need to select preamble resources in their respective preamble groups.

In other implementations, during resource configuration, the network device configures separate ROs and separate preambles for at least one of: a terminal device not supporting a network slice and a terminal device supporting a network slice/network slice group. For example, a terminal device not supporting a network slice, a terminal device supporting network slice 1, and a terminal device supporting network slice 2 can select PRACH resources in different RO groups and preamble resources in different preamble groups.

In other implementations, during resource configuration, the network device configures separate ROs and a shared preamble for at least one of: a terminal device not supporting a network slice and a terminal device supporting a network slice/network slice group. For example, a terminal device not supporting a network slice, a terminal device supporting network slice 1, and a terminal device supporting network slice 2 can select PRACH resources in different RO groups and preamble resources in the same preamble group.

In other implementations, during resource configuration, the network device configures separate ROs and a shared preamble for at least one of: a terminal device not supporting a network slice and a terminal device supporting a network slice/network slice group. Further, in a terminal device supporting a network slice/network slice group, separate preambles are configured for different network slices/network slice groups. For example, for UE 1 not supporting a network slice, UE 2 supporting network slice 1, and UE 3 supporting network slice 2, UE 2 and UE 3 select PRACH resources in the same RO group, and UE 1 and UE 2/UE 3 select PRACH resources in different RO groups, but UE 2 and UE 3 need to select preambles in different preamble groups. The network device distinguishes UE 1 and UE 2/UE 3 according to RO groups, and distinguishes UE 2 and UE 3 according to different preamble groups.

S604, the network device transmits a DL message to the terminal device.

In some implementations, the network device receives an UL message transmitted by the terminal device, and feeds back for the UL message, that is, transmits a DL message corresponding to the UL message to the terminal device.

In some implementations, the UL message may be Msg1 or MsgA. Correspondingly, the DL message may be Msg2 or MsgB. If the UL message is Msg1, the terminal device detects Msg2 in an RAR window by using an RA-RNTI. If the UL message is MsgA, the terminal device detects MsgB in the RAR window by using a MsgB-RNTI.

When separate ROs are supported, the terminal device can receive the DL message in any of the following manners, so that the terminal device can distinguish which RO the DL message is fed back for. Different RNTI formats can be used, for example, an RAR can be received and detected by using an existing RNTI calculation formula added with an offset, or the value range of f_id in the RNTI calculation formula can also be extended, and different value ranges represent different RO locations. Different search spaces can be used, for example, the RAR can be received and detected by using search spaces corresponding to different search space IDs, where the search space IDs can be configured in an RACH configuration such as RACH-ConfigCommon or RACH-ConfigDedicated, or can be configured in PDCCH-Config-Common. Indication information may further be added to the RAR, for example, by using a reserved bit in the RAR, or reusing other information bits (such as several bits in information bits of a UL-grant) to indicate the RO. Which RO and/or terminal device the RAR is targeted for can be finally determined by the reception of Msg4. The following takes the shared preamble as an example for illustration.

1. For 4-step RACH, different RA-RNTI formats can be used, for example, an existing RNTI calculation formula may be added with an offset to distinguish from an existing RA-RNTI format. An RAR transmitted to a terminal device not supporting a network slice adopts the existing RA-RNTI format, and an RAR transmitted to a terminal device supporting a network slice adopts an RA-RNTI format added with an offset to distinguish different RO locations. Exemplarily, the offset value is 14×80×8×2. RNTI=1+s_id+14×t_id+14×80×f_id+14×80×8×ul_carrier_id+14×80×8×2. The 4-step RACH is described above as an example, where the terminal device receives the DL message by adopting different RNTI formats. A processing procedure where the terminal device receives the DL message by adopting different RNTI formats in the 2-step RACH is the same as the 4-step RACH, which will not be repeated herein.

2. For 4-step RACH, different search spaces can be used. Different search space IDs may be used to distinguish different RO locations. For example, a terminal device supporting a network slice receives a PDCCH in a search space corresponding to search space ID 1, and a terminal device not supporting a network slice receives a PDCCH in a search space corresponding to search space ID 2. The 4-step RACH is described above as an example, where the terminal device receives the DL message by adopting different search spaces. A processing procedure where the terminal device receives the DL message by adopting different search spaces in the 2-step RACH is the same as the 4-step RACH, which will not be repeated herein.

3. For 4-step RACH, indication information may be carried in the RAR to indicate RO group information. Exemplarily, the RO group information can be indicated in a reserved bit or by reusing other information bits. When the reserved bit is 0, it represents an RO with a smaller RO frequency start location index, and when the reserved bit is 1, it represents an RO with a larger RO frequency start location index. For another example, when the reserved bit is 0, it represents an RO location not supporting a slice, and when the reserved bit is 1, it represents an RO location supporting a slice. For another example, when the reserved bit is 0, it means that other information bits are not reused, and original information bits are used for t is understood according to, and when the reserved bit is 1, it means that other information bits are reused, and new information bits are used for interpretation. For example, when the last bit of a UL-grant is 0, it represents an RO with a smaller RO frequency start location index, and when the last bit of the UL-grant is 1, it represents an RO with a larger RO frequency start location index. Alternatively, when the last bit of the UL-grant is 0, it represents an RO location not supporting a slice, and when the last bit of the UL-grant is 1, it represents an RO location supporting a slice. For example, if the last two bits in the UL-grant represent the RO group information, when the last two bits in the UL-grant are 00, it represents an RO with the smallest RO frequency start location index, when the last two bits in the UL-grant are 01, it represents an RO with the second smallest RO frequency start location index, and when the last two bits in the UL-grant are 11, it represents an RO with the largest RO frequency start location index.

4. For 4-step RACH, a targeted UE or RO can be finally determined according to Msg4 received. If ROs selected by terminal device 1 and terminal device 2 in different RO groups correspond to a same RNTI, after receiving Msg2, terminal device 1 and terminal device 2 each transmit Msg3 to the network device, and finally determine the UE/RO for contention resolution according to Msg4 received.

In implementations of the disclosure, by configuring the third random access resource corresponding to a specific network slice for the terminal device, subdivision of different network slices and subdivision of random access resources corresponding to different network slices are realized, so that the network device can further determine network slice information or network slice requirement of the terminal device to assist the network device in access control, thereby ensuring the access of a terminal device supporting a specific network slice.

It should be noted that, the "support" involved in implementations of the disclosure can be replaced with "match", "select", "expect", "preconfigure", or "allow", where "match" may include network device "match" and/or terminals device "match". For example, "a network slice supported by the terminal device" can be replaced with "a network slice matched by the terminal device", "a network slice selected by the terminal device", "a network slice expected by the terminal device", or "a network slice preconfigured by the terminal device".

It should be understood that, in various implementations of the disclosure, magnitudes of sequence numbers of the operations are not intended to indicate an execution sequence and the execution sequence of the operations should be determined by their functions and internal logic and shall not form any limit to an implementation process of implementations of the disclosure.

To implement the method for random access resource configuration above, implementations of the disclosure provide a terminal device. FIG. 7 illustrates a schematic diagram of a possible structure of a terminal device 800. The terminal device includes a receiving unit 801. The receiving unit 801 is configured to receive first configuration information, where the first configuration information includes at least two random access resources associated with or corresponding to the network slice.

In some implementations, the at least two random access resources associated with or corresponding to the network slice include: a first random access resource and/or a second random access resource, where the first random access resource corresponds to a terminal device supporting a network slice, a network slice group, or a network slice type, and the second random access resource corresponds to a terminal device not supporting a network slice, a network slice group, or a network slice type.

In some implementations, the at least two random access resources associated with or corresponding to the network slice include: a third random access resource, where the third random access resource corresponds to a terminal device supporting a first network slice, a first network slice group, or a first network slice type, and the third random access resource includes a resource set for different network slices or network slice groups, or a resource set for one network slice or network slice group.

In some implementations, an RO in the first random access resource is the same as an RO in the second random access resource, and/or a preamble in the first random access resource is different from a preamble in the second random access resource.

In some implementations, an RO in the first random access resource is different from an RO in the second random access resource, and/or a preamble in the first random access resource is different from a preamble in the second random access resource.

In some implementations, an RO in the first random access resource is different from an RO in the second random access resource, and/or a preamble in the first random access resource is the same as a preamble in the second random access resource.

In some implementations, different network slices supported by the terminal device correspond to different preambles in the first random access resource, and/or different network slice groups supported by the terminal device correspond to different preambles in the first random access resource, and/or different network slice types supported by the terminal device correspond to different preambles in the first random access resource.

In some implementations, different network slices supported by the terminal device correspond to a same RO or different ROs in the first random access resource, and/or different network slice groups supported by the terminal device correspond to a same RO or different ROs in the first random access resource, and/or different network slice types supported by the terminal device correspond to a same RO or different ROs in the first random access resource.

In some implementations, different network slices supported by the terminal device correspond to different ROs in the first random access resource, and/or different network slice groups supported by the terminal device correspond to different ROs in the first random access resource, and/or different network slice types supported by the terminal device correspond to different ROs in the first random access resource.

In some implementations, different network slices supported by the terminal device correspond to a same preamble or different preambles in the first random access resource, and/or different network slice groups supported by the terminal device correspond to a same preamble or different preambles in the first random access resource, and/or different network slice types supported by the terminal device correspond to a same preamble or different preambles in the first random access resource.

In some implementations, an RO in the third random access resource is the same as an RO in a second random access resource, and/or a preamble in the third random access resource is different from a preamble in the second random access resource, where the second random access resource corresponds to a terminal device not supporting a network slice, a network slice group, or a network slice type.

In some implementations, an RO in the third random access resource is different from an RO in a second random access resource, and/or a preamble in the third random access resource is different from a preamble in the second random access resource, where the second random access resource corresponds to a terminal device not supporting a network slice, a network slice group, or a network slice type.

In some implementations, an RO in the third random access resource is different from an RO in a second random access resource, and/or a preamble in the third random access resource is the same as a preamble in the second random access resource, where the second random access resource corresponds to a terminal device not supporting a network slice, a network slice group, or a network slice type.

In some implementations, different network slices supported by the terminal device correspond to different preambles in the third random access resource, and/or different network slice groups supported by the terminal device correspond to different preambles in the third random access resource, and/or different network slice types supported by the terminal device correspond to different preambles in the third random access resource.

In some implementations, different network slices supported by the terminal device correspond to a same RO or different ROs in the third random access resource, and/or different network slice groups supported by the terminal device correspond to a same RO or different ROs in the third random access resource, and/or different network slice types supported by the terminal device correspond to a same RO or different ROs in the third random access resource.

In some implementations, different network slices supported by the terminal device correspond to different ROs in the third random access resource, and/or different network slice groups supported by the terminal device correspond to different ROs in the third random access resource, and/or different network slice types supported by the terminal device correspond to different ROs in the third random access resource.

In some implementations, different network slices supported by the terminal device correspond to a same preamble or different preambles in the third random access resource, and/or different network slice groups supported by the terminal device correspond to a same preamble or different preambles in the third random access resource, and/or different network slice types supported by the terminal device correspond to a same preamble or different preambles in the third random access resource.

In some implementations, the first configuration information further includes at least one of: a network slice identifier, a network slice group identifier, a network slice type identifier, a mapping between network slice identifiers and network slice groups, a mapping between network slice identifiers and network slice types, and whether a network device supports a network slice.

In some implementations, the first configuration information further includes at least one of: a random access priority parameter corresponding to the network slice and random access priority parameters corresponding to the random access resources.

In some implementations, the first configuration information includes at least one of: random access common configuration information, 2-step random access common configuration information, and random access dedicated configuration information.

In some implementations, the terminal device 800 further includes a processing unit 802. The processing unit 802 is configured to determine random access resource for random access based on information of the network slice.

In some implementations, the information of the network slice includes at least one or more of: whether the terminal device supports a network slice, a network slice supported by the terminal device, a network slice group supported by the terminal device, a network slice type supported by the terminal device, a network slice selected by the terminal device, a network slice group selected by the device, a network slice type selected by the terminal device, a network slice required by the terminal device, a network slice group required by the terminal device, a network slice type required by the terminal device, a network slice expected by the terminal device, a network slice group expected by the terminal device, a network slice type expected by the terminal device, a network slice configured for the terminal device, a network slice group configured for the terminal device, a network slice type configured for the terminal device, a network slice allowed for the terminal device, a network slice group allowed for the terminal device, a network slice type allowed for the terminal device, and a network slice priority.

In some implementations, the processing unit 802 is configured to: determine a second random access resource as the random access resource for random access when the terminal device does not support a network slice, where the second random access resource corresponds to at least one of: not supporting a network slice, not supporting a network slice group, and not supporting a network slice type.

In some implementations, the processing unit 802 is configured to: determine a first random access resource as the random access resource for random access when the terminal device supports a network slice, where the first random access resource corresponds to at least one of: supporting a network slice, supporting a network slice group, and supporting a network slice type.

In some implementations, the processing unit 802 is configured to: determine a first random access resource as the random access resource for random access, when the terminal device supports a network slice and a network slice selected, required, or supported by the terminal device is configured with no corresponding first random access resource or fails to match a slice supported by a network device, where the first random access resource corresponds to at least one of: supporting a network slice, supporting a network slice group, and supporting a network slice type.

In some implementations, the processing unit 802 is configured to: determine a second random access resource as the random access resource for random access, when the terminal device supports a network slice and a network slice selected, required, or supported by the terminal device is configured with no corresponding first random access resource or fails to match a slice supported by a network device, where the second random access resource corresponds to at least one of: not supporting a network slice, not supporting a network slice group, and not supporting a network slice type.

In some implementations, the processing unit 802 is configured to: determine a first random access resource as the random access resource for random access, when a network slice selected, required, or supported by the terminal device is configured with the corresponding first random access resource or matches a slice supported by a network device.

In some implementations, the processing unit 802 is configured to: determine a first random access resource among at least one first random access resource as the random access resource for random access randomly, when a network slice selected, required, or supported by the terminal device is configured with the corresponding at least one first random access resource or matches a slice supported by a network device.

In some implementations, the processing unit 802 is configured to: determine a first random access resource with a highest priority among at least one first random access resource as the random access resource for random access, when a network slice selected, required, or supported by the terminal device is configured with the corresponding at least one first random access resource or matches a slice supported by a network device, or a network slice with a highest priority selected, required, or supported by the terminal device matches the slice supported by the network device.

In some implementations, the processing unit 802 is configured to: select a third random access resource, when a network slice selected, required, or supported by the terminal device is configured with corresponding at least one third random access resource or matches a slice supported by a network device.

In some implementations, the processing unit 802 is configured to: select a third random access resource, when a network slice with a highest priority selected, required, or supported by the terminal device is configured with corresponding at least one third random access resource or matches a slice supported by a network device.

In some implementations, the processing unit 802 is further configured to: perform random access based on the random access resource determined.

In some implementations, the processing unit 802 is configured to: receive a DL message by adopting at least one of: different RNTI formats, different search spaces, indication information carried in an RAR, and a Msg4, when the random access resource is configured with different ROs and a same preamble.

In some implementations, the processing unit 802 is configured to: determine an RO location corresponding to the RAR, indicate an RO location corresponding to the DL message received, or determine an RO location for receiving the DL message, according to the RNTI formats, the search spaces, the indication information carried in the RAR, or the Msg4.

In some implementations, the terminal device supports different network slices and determines an RO location corresponding to the RAR, indicates an RO location corresponding to the DL message received, or determines an RO location for receiving the DL message, according to different RNTI formats, different search spaces, or different indication information carried in the RAR.

In some implementations, when the terminal device receives the DL message by adopting different RNTI formats, the terminal device receives the DL message based on a first RNTI format, where the terminal device supports a network slice, and/or the terminal device receives the DL message based on a second RNTI format, where the terminal device does not support a network slice, where the first RNTI format is different from the second RNTI format.

In some implementations, when the terminal device receives the DL message by adopting different search spaces, the terminal device receives the DL message in a first search space, where the terminal device supports a network slice, and/or the terminal device receives the DL message in a second search space, where the terminal device does not support a network slice, where the first search space is different from the second search space.

In some implementations, when the terminal device determines an RO location or receives the DL message by adopting the indication information carried in the RAR, when first bit information in the indication information has a first value, the indication information indicates a first RO group, and/or when the first bit information in the indication information has a second value, the indication information indicates a second RO group, where the first value is different from the second value.

In some implementations, the terminal device supporting a network slice includes the terminal device supporting different network slices or different network slice group.

Figure 8:
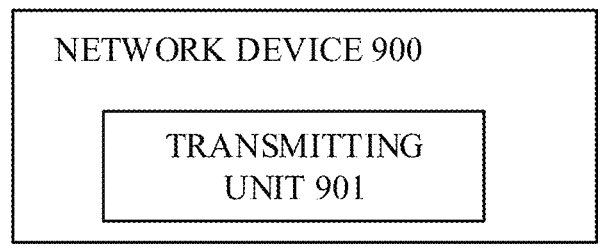
FIG. 8 is a schematic diagram of a structure of a network device according to implementations of the disclosure.

To implement the method for random access resource configuration above, implementations of the disclosure provide a network device. FIG. 8 illustrates a schematic diagram of a possible structure of a network device 900. The network device 900 includes a transmitting unit 901. The transmitting unit 901 is configured to: transmit first configuration information to a terminal device, where the first configuration information includes at least two random access resources associated with or corresponding to a network slice.

In some implementations, the at least two random access resources associated with or corresponding to the network slice include: a first random access resource and/or a second random access resource, where the first random access resource corresponds to a terminal device supporting a network slice, a network slice group, or a network slice type, and the second random access resource corresponds to a terminal device not supporting a network slice, a network slice group, or a network slice type.

In some implementations, the at least two random access resources associated with or corresponding to the network slice include: a third random access resource, where the third random access resource corresponds to a terminal device supporting a first network slice, a first network slice group, or a first network slice type, and the third random access resource includes a resource set for different network slices or network slice groups, or a resource set for one network slice or network slice group.

In some implementations, an RO in the first random access resource is the same as an RO in the second random access resource, and/or a preamble in the first random access resource is different from a preamble in the second random access resource.

In some implementations, an RO in the first random access resource is different from an RO in the second random access resource, and/or a preamble in the first random access resource is different from a preamble in the second random access resource.

In some implementations, an RO in the first random access resource is different from an RO in the second random access resource, and/or a preamble in the first random access resource is the same as a preamble in the second random access resource.

In some implementations, different network slices supported by the terminal device correspond to different preambles in the first random access resource, and/or different network slice groups supported by the terminal device correspond to different preambles in the first random access resource, and/or different network slice types supported by the terminal device correspond to different preambles in the first random access resource.

In some implementations, different network slices supported by the terminal device correspond to a same RO or different ROs in the first random access resource, and/or different network slice groups supported by the terminal device correspond to a same RO or different ROs in the first random access resource, and/or different network slice types supported by the terminal device correspond to a same RO or different ROs in the first random access resource.

In some implementations, different network slices supported by the terminal device correspond to different ROs in the first random access resource, and/or different network slice groups supported by the terminal device correspond to different ROs in the first random access resource, and/or different network slice types supported by the terminal device correspond to different ROs in the first random access resource.

In some implementations, different network slices supported by the terminal device correspond to a same preamble or different preambles in the first random access resource, and/or different network slice groups supported by the terminal device correspond to a same preamble or different preambles in the first random access resource, and/or different network slice types supported by the terminal device correspond to a same preamble or different preambles in the first random access resource.

In some implementations, an RO in the third random access resource is the same as an RO in a second random access resource, and/or a preamble in the third random access resource is different from a preamble in the second random access resource, where the second random access resource corresponds to a terminal device not supporting a network slice, a network slice group, or a network slice type.

In some implementations, an RO in the third random access resource is different from an RO in a second random access resource, and/or a preamble in the third random access resource is different from a preamble in the second random access resource, where the second random access resource corresponds to a terminal device not supporting a network slice, a network slice group, or a network slice type.

In some implementations, an RO in the third random access resource is different from an RO in a second random access resource, and/or a preamble in the third random access resource is the same as a preamble in the second random access resource, where the second random access resource corresponds to a terminal device not supporting a network slice, a network slice group, or a network slice type.

In some implementations, different network slices supported by the terminal device correspond to different preambles in the third random access resource, and/or different network slice groups supported by the terminal device correspond to different preambles in the third random access resource, and/or different network slice types supported by the terminal device correspond to different preambles in the third random access resource.

In some implementations, different network slices supported by the terminal device correspond to a same RO or different ROs in the third random access resource, and/or different network slice groups supported by the terminal device correspond to a same RO or different ROs in the third random access resource, and/or different network slice types supported by the terminal device correspond to a same RO or different ROs in the third random access resource.

In some implementations, different network slices supported by the terminal device correspond to different ROs in the third random access resource, and/or different network slice groups supported by the terminal device correspond to different ROs in the third random access resource, and/or different network slice types supported by the terminal device correspond to different ROs in the third random access resource.

In some implementations, different network slices supported by the terminal device correspond to a same preamble or different preambles in the third random access resource, and/or different network slice groups supported by the terminal device correspond to a same preamble or different preambles in the third random access resource, and/or different network slice types supported by the terminal device correspond to a same preamble or different preambles in the third random access resource.

In some implementations, the first configuration information further includes at least one of: a network slice identifier, a network slice group identifier, a network slice type identifier, a mapping between network slice identifiers and network slice groups, a mapping between network slice identifiers and network slice types, and whether the network device supports a network slice.

In some implementations, the first configuration information further includes at least one of: a random access priority parameter corresponding to the network slice and random access priority parameters corresponding to the random access resources.

In some implementations, the first configuration information includes at least one of: random access common configuration information, 2-step random access common configuration information, and random access dedicated configuration information.

Implementations of the disclosure further provide a terminal device. The terminal device includes a processor and a memory configured to store computer programs executable by the processor, and the processor is configured to execute the computer programs to perform the method for random access resource configuration performed by the terminal device.

Implementations of the disclosure further provide a network device. The network device includes a processor and a memory configured to store computer programs executable by the processor, and the processor is configured to execute the computer programs to perform the method for random access resource configuration performed by the network device.

Implementations of the disclosure further provide a chip. The chip includes a processor configured to invoke and execute computer programs stored in a memory, to cause a device equipped with the chip to perform the method for random access resource configuration performed by the terminal device.

Implementations of the disclosure further provide a chip. The chip includes a processor configured to invoke and execute computer programs stored in a memory, to cause a device equipped with the chip to perform the method for random access resource configuration performed by the network device.

Implementations of the disclosure further provide a storage medium storing executable programs, which when executed by a processor, are configured to perform the method for random access resource configuration performed by the terminal device.

Implementations of the disclosure further provide a storage medium storing executable programs, which when executed by a processor, are configured to perform the method for random access resource configuration performed by the network device.

Implementations of the disclosure further provide a computer program product. The computer program product includes computer program instructions operable with a computer to perform the method for random access resource configuration performed by the terminal device.

Implementations of the disclosure further provide a computer program product. The computer program product includes computer program instructions operable with a computer to perform the method for random access resource configuration performed by the network device.

Implementations of the disclosure further provide a computer program. The computer program is operable with a computer to perform the method for random access resource configuration performed by the terminal device.

Implementations of the disclosure further provide a computer program. The computer program is operable with a computer to perform the method for random access resource configuration performed by the network device.

Figure 9:
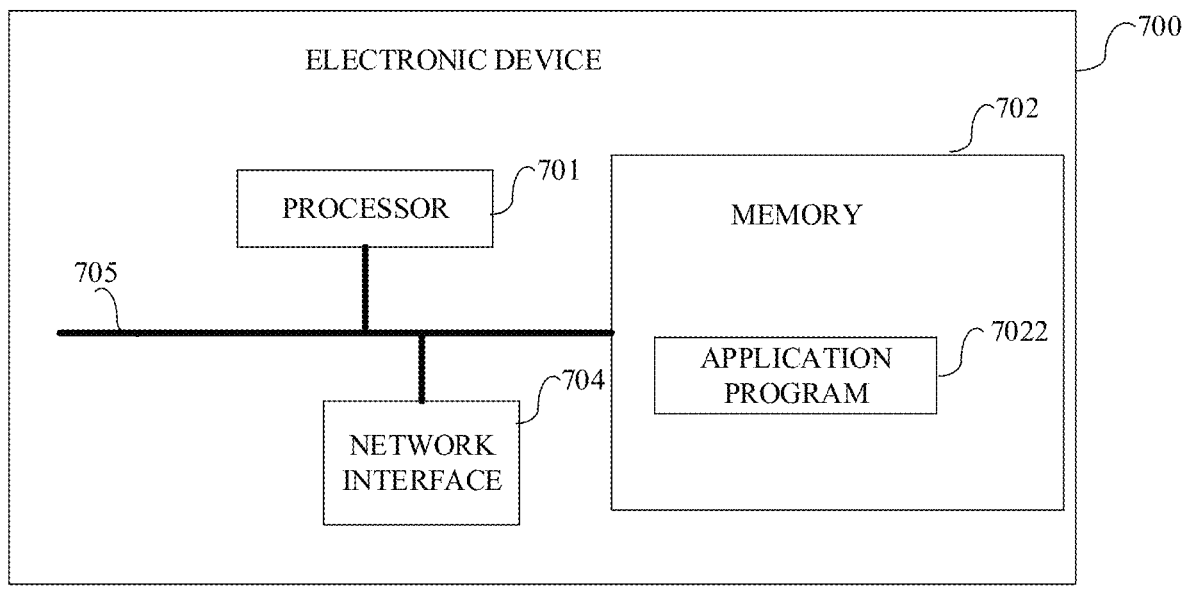
FIG. 9 is a schematic diagram of a hardware structure of an electronic device according to implementations of the disclosure.

FIG. 9 is a schematic diagram of a hardware structure of an electronic device (terminal device or network device) according to implementations of the disclosure. The electronic device 700 includes at least one processor 701, a memory 702, and at least one network interface 704. Various components in the electronic device 700 are coupled together via a bus system 705. It can be understood that, the bus system 705 is configured for connection and communication between these components. In addition to a data bus, the bus system 705 further includes a power bus, a control bus, and a status signal bus. However, for the convenience of illustration, various buses are marked as the bus system 705 in FIG. 9.

It can be understood that, the memory 702 may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM), a ferromagnetic random access memory (FRAM), a flash memory, a magnetic surface memory, an optical disc, or a compact disc ROM (CD-ROM). The magnetic surface memory may be a magnetic disc memory or a magnetic tape memory. The volatile memory can be a RAM that acts as an external cache. By way of example but not limitation, many forms of RAM are available, such as a static RAM (SRAM), a synchronous static random access memory (SSRAM), a dynamic RAM (DRAM), a synchronous DRAM (SDRAM), a double data rate SDRAM (DDR SDRAM), an enhanced SDRAM (ESDRAM), a synchronous link DRAM (synch-link DRAM, SLDRAM), and a direct rambus RAM (DR-RAM). The memory 702 described in implementations of the disclosure is intended to include, but is not limited to, these and any other suitable types of memory.

The memory 702 in implementations of the disclosure is configured to store various types of data to support operations of the electronic device 700. Examples of the data includes any computer program operable with the electronic device 700, such as an application program 7022. Programs for implementing the method of implementations of the disclosure may be contained in the application program 7022.

The foregoing method disclosed in implementations of the disclosure can be applied to the processor 701, or can be implemented by the processor 701. The processor 701 may be an integrated circuit chip with signal processing capabilities. During implementation, each step of the foregoing method may be completed by an integrated logic circuit in the form of hardware or an instruction in the form of software in the processor 701. The processor 701 may be a general-purpose processor, a digital signal processor (DSP), or other programmable logic devices, discrete gates or transistor logic devices, discrete hardware components, etc. The processor 701 can implement or execute the methods, steps, and logic blocks disclosed in implementations of the disclosure. The general purpose processor may be a microprocessor, or may be any conventional processor or the like.

The steps of the method disclosed in implementations of the disclosure may be implemented through a hardware decoding processor, or may be performed by hardware and software modules in the decoding processor. The software module can be located in a storage medium. The storage medium is located in the memory 702. The processor 701 reads the information in the memory 702, and completes the steps of the method described above with the hardware of the processor 701.

In exemplary implementations, the electronic device 700 may be implemented by one or more application specific integrated circuits (ASIC), DSPs, programmable logic devices (PLD), complex programmable logic devices (CPLD), field programmable gate arrays (FPGA), general-purpose processors, controllers, microcontroller units (MCU), microprocessor units (MPU), or other electronic components, to implement the foregoing method.

The disclosure is described herein with reference to schematic flowcharts and/or block diagrams of methods, apparatuses (systems), and computer program products according to implementations of the disclosure. It should be understood that each flow and/or block in the flowchart and/or block diagram, and a combination of flow and/or block in the flowchart and/or block diagram can be implemented by computer program instructions. These computer program instructions may be provided to a general purpose computer, a special purpose computer, an embedded processor, or a processor of other programmable data processing apparatuses to form a machine, such that devices for implementing functions specified by one or more flows in the flowchart and/or one or more blocks in the block diagram may be generated by executing the instructions with the computer or the processor of other programmable data processing apparatuses.

The computer program instructions may also be stored in a computer-readable memory that can direct the computer or other programmable data processing apparatuses to operate in a given manner, so that the instructions stored in the computer-readable memory produce a manufactured article including an instruction device, and the instruction device implements the functions specified by one or more flows in the flowchart and/or one or more blocks in the block diagram.

The computer program instructions may also be loaded onto the computer or other programmable data processing apparatuses, such that a series of process steps may be executed on the computer or other programmable apparatuses to produce processing implemented by the computer, so that the instructions executed on the computer or other programmable apparatuses provide steps for implementing the functions specified by one or more flows in the flowchart and/or one or more blocks in the block diagram.

It should be understood that, the terms "system" and "network" in the disclosure are usually used interchangeably throughout this disclosure. The term "and/or" in the disclosure only describes an association relationship between associated objects, which means that there can be three relationships. For example, A and/or B can mean A alone, both A and B exist, and B alone. In addition, the character "/" in the disclosure generally indicates that the associated objects are in an "or" relationship.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for random access resource configuration, comprising:
receiving, by a terminal device, first configuration information, the first configuration information comprising at least two random access resources associated with or corresponding to a network slice;
wherein the at least two random access resources associated with or corresponding to the network slice comprise: a first random access resource and/or a second random access resource;
wherein the first random access resource corresponds to a terminal device supporting a network slice, a network slice group, or a network slice type; and
wherein the second random access resource corresponds to a terminal device not supporting a network slice, a network slice group, or a network slice type.

2. The method of claim 1, wherein a random access occasion (RO) in the first random access resource is the same as an RO in the second random access resource, and/or a preamble in the first random access resource is different from a preamble in the second random access resource.

3. The method of claim 1, wherein an RO in the first random access resource is different from an RO in the second random access resource, and/or a preamble in the first random access resource is different from a preamble in the second random access resource.

4. The method of claim 1, wherein different network slice groups supported by the terminal device correspond to different preambles in the first random access resource.

5. The method of claim 1, wherein different network slice groups supported by the terminal device correspond to a same RO or different ROs in the first random access resource.

6. The method of claim 1, wherein different network slice groups supported by the terminal device correspond to different ROs in the first random access resource.

7. The method of claim 1, further comprising:
determining, by the terminal device, a random access resource for random access based on information of the network slice.

8. The method of claim 6, wherein the information of the network slice comprises a network slice group supported by the terminal device.

9. The method of claim 8, wherein determining, by the terminal device, the random access resource for random access based on the information of the network slice comprises:
determining, by the terminal device, the second random access resource as the random access resource for random access when the terminal device does not support a network slice, wherein the second random access resource corresponds to not supporting a network slice group.

10. A terminal device, comprising:
a transceiver;
a memory configured to store computer programs; and
a processor configured to invoke and execute the computer programs stored in the memory to cause the transceiver to:
receive first configuration information, the first configuration information comprising at least two random access resources associated with or corresponding to a network slice;
wherein the at least two random access resources associated with or corresponding to the network slice comprise: a first random access resource and/or a second random access resource;
wherein the first random access resource corresponds to a terminal device supporting a network slice, a network slice group, or a network slice type; and
wherein the second random access resource corresponds to a terminal device not supporting a network slice, a network slice group, or a network slice type.

11. The terminal device of claim 10, wherein a random access occasion (RO) in the first random access resource is the same as an RO in the second random access resource, and/or a preamble in the first random access resource is different from a preamble in the second random access resource.

12. The terminal device of claim 10, wherein an RO in the first random access resource is different from an RO in the second random access resource, and/or a preamble in the first random access resource is different from a preamble in the second random access resource.

13. The terminal device of claim 10, wherein different network slice groups supported by the terminal device correspond to different preambles in the first random access resource.

14. The terminal device of claim 10, wherein different network slice groups supported by the terminal device correspond to a same RO or different ROs in the first random access resource.

15. The terminal device of claim 10, wherein different network slice groups supported by the terminal device correspond to different ROs in the first random access resource.

16. The terminal device of claim 10, wherein the processor is further configured to invoke and execute the computer programs stored in the memory to:
determine a random access resource for random access based on information of the network slice.

17. The terminal device of claim 16, wherein the information of the network slice comprises a network slice group supported by the terminal device.

18. A network device comprising:
a transceiver;
a memory configured to store computer programs; and
a processor configured to invoke and execute the computer programs stored in the memory to cause the transceiver to:
transmit first configuration information to a terminal device, the first configuration information comprising at least two random access resources associated with or corresponding to a network slice;
wherein the at least two random access resources associated with or corresponding to the network slice comprise: a first random access resource and/or a second random access resource;
wherein the first random access resource corresponds to a terminal device supporting a network slice, a network slice group, or a network slice type; and
wherein the second random access resource corresponds to a terminal device not supporting a network slice, a network slice group, or a network slice type.

* * * * *